United States Patent
Tomita et al.

(10) Patent No.: US 9,499,695 B2
(45) Date of Patent: Nov. 22, 2016

(54) POLYCARBONATE RESIN COMPOSITION

(71) Applicant: Mitsubishi Engineering-Plastics Corporation, Minato-ku (JP)

(72) Inventors: Keisuke Tomita, Kanagawa (JP); Toshiki Monden, Kanagawa (JP)

(73) Assignee: Mitsubishi Engineering-Plastics Corporation, Minato-ku (JP)

( * ) Notice: Subject to any disclaimer, the term of this patent is extended or adjusted under 35 U.S.C. 154(b) by 132 days.

(21) Appl. No.: 14/394,876

(22) PCT Filed: Mar. 21, 2013

(86) PCT No.: PCT/JP2013/057963
§ 371 (c)(1),
(2) Date: Oct. 16, 2014

(87) PCT Pub. No.: WO2013/157345
PCT Pub. Date: Oct. 24, 2013

(65) Prior Publication Data
US 2015/0086856 A1  Mar. 26, 2015

(30) Foreign Application Priority Data

Apr. 20, 2012 (JP) ................. 2012-096203
Apr. 20, 2012 (JP) ................. 2012-096205
Jun. 11, 2012 (JP) ................. 2012-131699

(51) Int. Cl.
*C08L 69/00* (2006.01)
*H01M 2/02* (2006.01)
*C08L 51/08* (2006.01)

(52) U.S. Cl.
CPC .............. *C08L 69/00* (2013.01); *H01M 2/026* (2013.01); *H01M 2/028* (2013.01); *H01M 2/0262* (2013.01); *C08L 51/08* (2013.01); *C08L 2201/02* (2013.01); *C08L 2203/20* (2013.01); *C08L 2205/03* (2013.01); *Y02P 20/582* (2015.11)

(58) Field of Classification Search
CPC .. H01M 2/026; H01M 2/0262; H01M 2/028; C08L 69/00; C08L 2201/02; C08L 2203/30; C08L 2205/03
See application file for complete search history.

(56) References Cited

U.S. PATENT DOCUMENTS

| | | | |
|---|---|---|---|
| 5,234,979 A | 8/1993 | Todtemann et al. | |
| 6,737,465 B2 * | 5/2004 | Seidel et al. | 524/451 |
| 2004/0249070 A1 * | 12/2004 | Lim et al. | 525/67 |
| 2006/0030647 A1 | 2/2006 | Ebeling et al. | |
| 2011/0003918 A1 | 1/2011 | Eckel et al. | |

FOREIGN PATENT DOCUMENTS

| | | |
|---|---|---|
| CN | 1737058 A | 2/2006 |
| CN | 101351504 A | 1/2009 |
| CN | 102325840 A | 1/2012 |
| JP | 59-202240 A | 11/1984 |
| JP | 62-004746 A | 1/1987 |
| JP | 10-095911 A | 4/1998 |
| JP | 2002-348460 A | 12/2002 |
| JP | 2004-359889 A | 12/2004 |
| JP | 2007-154173 A | 6/2007 |
| JP | 2008-280491 A | 11/2008 |
| JP | 2008-285507 A | 11/2008 |
| JP | 2009-007487 A | 1/2009 |
| JP | 2011-057888 A | 3/2011 |
| WO | 2007/055305 A1 | 5/2007 |
| WO | WO 2007/078079 A1 | 7/2007 |

OTHER PUBLICATIONS

Combined Office Action and Search Report issued Apr. 23, 2015 in Chinese Patent Application No. 201380020524.0 (with English Translation of Category of Cited Documents).
International Search Report issued Jun. 18, 2013 in PCT/JP2013/057963 filed Mar. 21, 2013.

* cited by examiner

*Primary Examiner* — Anca Eoff
(74) *Attorney, Agent, or Firm* — Oblon, McClelland, Maier & Neustadt, L.L.P.

(57) ABSTRACT

The present invention provides a polycarbonate resin composition for molding a molded article having a thin-walled section and exhibiting a high level of flame resistance and impact resistance, and an excellent surface appearance (low-gloss property). More specifically, the present invention is a polycarbonate resin composition for molding a polycarbonate resin molded article having a thin-walled section with a wall thickness of 0.6 mm or less, the polycarbonate resin composition being characterized in that the resin composition contains an oligomeric phosphoric acid ester flame retardant (B1) and/or a phosphazene flame retardant (B2), and the content of flame retardant with respect to 100 parts by mass of polycarbonate resin (A) is: i) 5 to 20 parts by mass when the resin composition contains only the oligomeric phosphoric acid ester flame retardant (B1); ii) 10 to 30 parts by mass when the resin composition contains only the phosphazene flame retardant (B2); or iii) a total of 5 to 30 parts by mass when the resin composition contains both the oligomeric phosphoric acid ester flame retardant (B1) and the phosphazene flame retardant (B2), with the content ratio thereof being 1 to 49 mass % of (B1) and 99 to 51 mass % of (B2), the resin composition additionally contains 3 to 15 parts by mass of a siloxane-based core/shell elastomer (C) and 0.8 to 10 parts by mass of carbon black (D) with respect to 100 parts by mass of polycarbonate resin (A), the siloxane-based core/shell elastomer (C) has a silicon content of 9.1 to 30 mass % and a number-average particle size in the range of 50 to 1,000 nm, and the flow rate per unit time of the resin composition is 15 to 50 ×$10^{-2}$ cm$^3$/sec.

15 Claims, No Drawings

POLYCARBONATE RESIN COMPOSITION

TECHNICAL FIELD

The present invention relates to a polycarbonate resin composition, and more particularly relates to a polycarbonate resin composition for molding a polycarbonate resin molded article having a thin-walled section and exhibiting a high level of flame resistance and impact resistance, and an excellent surface appearance (low-gloss property).

BACKGROUND ART

Polycarbonate resins have excellent heat resistance, mechanical properties, and electrical properties, and they are widely used as materials in automobiles, in electric and electronic devices, in housing construction, and for manufacturing parts in other industrial fields. In particular, flame resistant polycarbonate resins are suitably used as parts in computers, notebook style personal computers, mobile telephones, and office automation and data devices such as printers, and copiers.

Blending a halogen-based flame retardant into a polycarbonate resin has been used in the past as means of imparting flame resistance to the polycarbonate resin. However, a polycarbonate resin composition comprising a halogen-based flame retardant that contains chlorine or bromine causes a decrease in thermal stability and corrosion of the molding machine screws and molds during the molding process. As an alternative method, a polycarbonate resin compositions comprising a phosphorus flame retardant are preferably used (for example, see Patent Documents 1 and 2).

The method of including such a phosphorus flame retardant in a polycarbonate resin can shorten the flaming time effectively through forming a char of a phosphorus compound on the surface of the resin and effectively diluting the combustible gases in the gas phase of combustion.

However, a polycarbonate resin that contains a phosphorous flame retardant causes a pronounced decrease in the impact resistance that is inherent in polycarbonate resins, so formulations that also include an elastomer are used. The applicant has made various proposals for such polycarbonate resins that contain both a phosphorus flame retardant and an elastomer as can be seen in Patent Documents 3 to 7.

More specifically, Patent Document 3 proposes a polycarbonate resin composition wherein the generation of white spot contamination on the molded surface is inhibited by blending a phosphorus flame retardant and a special anti-dripping agent comprising an organic polymer-coated polyfluoroethylene into an aromatic polycarbonate resin. Patent Document 4 proposes a polycarbonate resin composition prepared by blending a phosphorus flame retardant, polyfluoroethylene, and a polyorganosiloxane-containing graft copolymer, which is obtained by copolymerizing a first vinyl monomer and a second vinyl monomer with polyorganosiloxane at a specific ratio, into an aromatic polycarbonate resin. Moreover, Patent Document 5 proposes a polycarbonate resin composition prepared by blending a phosphorus flame retardant, a vinyl monomer-grafted silicone/acrylic rubber, and an anti-dripping agent into an aromatic polycarbonate resin at specific ratios.

Furthermore, Patent Document 6 proposes a polycarbonate resin composition prepared by blending talc as an essential component, a phosphorus flame retardant, a polyfluoroethylene, and a polyorganosiloxane-containing graft copolymer, which is obtained by copolymerizing a first and a second polyfunctional vinyl monomer at a specified ratio in the presence of a specified amount of polyorganosiloxane particles, into an aromatic polycarbonate resin at specific ratios. In addition, Patent Document 7 proposes a polycarbonate resin composition prepared by blending a phosphorus flame retardant, a fluoropolymer, a multilayered polymer having a crosslinked polyalkyl acrylate core and an alkyl (meth)acrylate polymeric shell, titanium oxide, carbon black, and a dye or pigment into a polycarbonate resin at specific ratios.

CITATION LIST

Patent Literature

Patent Document 1: Japanese Patent Application Laid-open No. S59-202240
Patent Document 2: Japanese Patent Application Laid-open No. S62-4746
Patent Document 3: Japanese Patent Application Laid-open No. 2007-154173
Patent Document 4: Japanese Patent Application Laid-open No. 2008-280491
Patent Document 5: Japanese Patent Application Laid-open No. 2009-7487
Patent Document 6: Japanese Patent Application Laid-open No. 2008-285507
Patent Document 7: Japanese Patent Application Laid-open No. 2011-57888

SUMMARY OF INVENTION

Technical Problem

Recently, however, electric and electronic device parts have become extremely thin-walled and miniaturized due to the trend toward miniaturization of the devices themselves, and for example, molded products comprising a thin-walled section of 0.6 mm or less, and particularly 0.3 to 0.4 mm, in thickness have become needed for the frames or housings of battery packs used in mobile terminal devices such as tablets and touch screen terminals. Fire resistance at the V-0 to V-1 level in UL94 testing is strongly required in such thin-walled products, and even more demanding product specifications are demanded for high flow properties and impact resistance, as well as an excellent surface appearance, namely, an appearance that presents a low luster, high-class image.

Unfortunately, the resin compositions of the aforementioned patent documents could not always satisfy all these requirements completely.

The present invention was created in the light of these problems, and an object of the present invention is to provide a polycarbonate resin composition for molding a molded article comprising a thin-walled section and having a high level of flame resistance and impact resistance, and an excellent surface appearance (low-gloss property).

Solution to Problem

To overcome these problems, the inventors carried out a series of incisive investigations of polycarbonate resins for molding a polycarbonate resin molded article comprising a thin-walled section of 0.6 mm or less in thickness, and as a result they discovered that carbon black exhibits effectiveness as a flame retardant, and that a polycarbonate resin composition for thin-wall molding that has high levels of flame resistance and impact resistance, as well as an excellent surface appearance (low-gloss property) can be obtained by combining carbon black with a siloxane-based core/shell elastomer having a specific silicon content and average particle size, and blending the same together with an oligomeric phosphoric acid ester flame retardant and/or phosphazene flame retardant in the resin composition, while setting the flow rate (Q value) per unit time of the resin composition to a specific range, thus completing the present invention.

The present invention provides the polycarbonate resin composition described below.

[1] A polycarbonate resin composition for molding a polycarbonate resin molded article having a thin-walled section with a wall thickness of 0.6 mm or less,
the polycarbonate resin composition being characterized in that
the resin composition contains an oligomeric phosphoric acid ester flame retardant (B1) and/or a phosphazene flame retardant (B2), and the content of flame retardant with respect to 100 parts by mass of polycarbonate resin (A) is:
  i) 5 to 20 parts by mass when the resin composition contains only the oligomeric phosphoric acid ester flame retardant (B1);
  ii) 10 to 30 parts by mass when the resin composition contains only the phosphazene flame retardant (B2); or
  iii) a total of 5 to 30 parts by mass when the resin composition contains both the oligomeric phosphoric acid ester flame retardant (B1) and the phosphazene flame retardant (B2), with the content ratio thereof being 1 to 49 mass % of (B1) and 99 to 51 mass % of (B2),
the resin composition additionally contains 3 to 15 parts by mass of a siloxane-based core/shell elastomer (C) and 0.8 to 10 parts by mass of carbon black (D) with respect to 100 parts by mass of polycarbonate resin (A),
the siloxane-based core/shell elastomer (C) has a silicon content of 9.1 to 30 mass % and a number-average particle size in the range of 50 to 1,000 nm, and
the flow rate per unit time of the resin composition is 15 to $50 \times 10^{-2}$ cm$^3$/sec (when measured using an overhead flow tester at 280° C. with a load of 160 kgf/cm$^2$ in accordance with the method of JIS K7210 Appendix C).

[2] A polycarbonate resin composition for molding a polycarbonate resin molded article having a thin-walled section with a wall thickness of 0.6 mm or less, this polycarbonate resin composition being characterized in that
the resin composition contains 5 to 20 parts by mass of an oligomeric phosphoric acid ester flame retardant (B1), 3 to 9 parts by mass of a siloxane-based core/shell elastomer (C) and 0.8 to 5 parts by mass of carbon black (D) with respect to 100 parts by mass of polycarbonate resin (A);
the siloxane-based core/shell elastomer (C) has a silicon content of 9.1 to 30 mass % and a number-average particle size in the range of 50 to 1,000 nm; and
the flow rate per unit time of the resin composition is 15 to $50 \times 10^{-2}$ cm$^3$/sec (when measured using an overhead flow tester at 280° C. with a load of 160 kgf/cm$^2$ in accordance with the method of JIS K7210 Appendix C).

[3] A polycarbonate resin composition for molding a polycarbonate resin molded article having a thin-walled section with a wall thickness of 0.6 mm or less, characterized in that the resin composition contains 10 to 30 parts by mass of a phosphazene flame retardant (B2), 4 to 15 parts by mass of a siloxane-based core/shell elastomer (C) and 1 to 10 parts by mass of carbon black (D) with respect to 100 parts by mass of polycarbonate resin (A);
the siloxane-based core/shell elastomer (C) has a silicon content of 9.1 to 30 mass % and a number-average particle size in the range of 50 to 1,000 nm; and
the flow rate per unit time of the resin composition is 15 to $50 \times 10^{-2}$ cm$^3$/sec (when measured using an overhead flow tester at 280° C. with a load of 160 kgf/cm$^2$ in accordance with the method of JIS K7210 Appendix C).

[4] A polycarbonate resin composition for molding a polycarbonate resin molded article having a thin-walled section with a wall thickness of 0.6 mm or less, the polycarbonate resin composition being characterized in that
the resin composition contains a total of 5 to 30 parts by mass of an oligomeric phosphoric acid ester flame retardant (B1) and a phosphazene flame retardant (B2), 3 to 9.7 parts by mass of a siloxane-based core/shell elastomer (C) and 0.8 to 5 parts by mass of carbon black (D) with respect to 100 parts by mass of polycarbonate resin (A);
the content ratio of the oligomeric phosphoric acid ester flame retardant (B1) to the phosphazene flame retardant (B2) is 1 to 49 mass % of (B1):99 to 51 mass % of (B2);
the siloxane-based core/shell elastomer (C) has a silicon content of 9.1 to 30 mass % and a number-average particle size in the range of 50 to 1,000 nm; and
the flow rate per unit time of the resin composition is 15 to $50 \times 10^{-2}$ cm$^3$/sec (when measured using an overhead flow tester at 280° C. with a load of 160 kgf/cm$^2$ in accordance with the method of JIS K7210 Appendix C).

[5] The polycarbonate resin composition according to any of [1] to [4] above, characterized in that the molded article of the polycarbonate resin composition is a frame or housing for a battery pack.

[6] The polycarbonate resin composition of any of [1] to [4] above, characterized in that the oligomeric phosphoric acid ester flame retardant (B1) is a phosphoric acid ester represented by general formula 1 below:

[Chemical Formula 1]

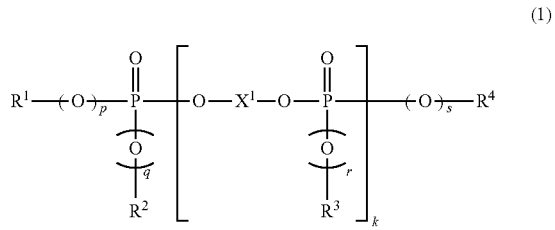

(where $R^1$, $R^2$, $R^3$, and $R^4$ each represent a $C_{1-6}$ alkyl group or optionally alkyl-substituted $C_{6-20}$ aryl group; p, q, r, and s each represent either 0 or 1; k is an integer from 1 to 5; and $X^1$ represents an arylene group).

[7] The polycarbonate resin composition according to any of [1] to [4] above, characterized in that the siloxane-based core/shell elastomer (C) is an elastomer having a core layer containing a siloxane-based rubber component and a shell layer containing an acrylic or acrylonitrile-styrene (co)polymer component.

[8] The polycarbonate resin composition according to any of [1] to [4] above, additionally containing 0.001 to 1 part by mass of a fluorine-containing resin (E) with respect to 100 parts by mass of polycarbonate resin (A).

Advantageous Effects of Invention

The polycarbonate resin composition of the present invention can provide a polycarbonate resin composition for molding a polycarbonate resin molded article comprising a thin-walled section that has high flame resistance and impact resistance, and an excellent surface appearance (low-gloss property).

A previous example wherein carbon black has been blended into a polycarbonate resin composition containing a phosphorus flame retardant can be seen in Patent Document 7 noted above, but that composition was blended to prevent transparency and improve appearance, and as disclosed in paragraph [0100] of Patent Document 7, making the carbon black content very high is considered detrimental. In the light of this previous knowledge, the fact that flame resistance is improved by blending carbon black into a polycarbonate resin in the above amount is truly an innovation, and it is astonishing that the polycarbonate resin material having not only high flame resistance and impact resistance, but also an excellent surface appearance can be obtained by additionally including a specified amount of a siloxane core/shell elastomer having a specific silicon content and specific particle size, respectively, and by further including a specific ratio of oligomeric phosphoric acid ester flame retardant and/or phosphazene flame retardant.

DESCRIPTION OF EMBODIMENTS

The present invention is described in detail below through embodiments and examples, but the present invention is by no means limited to the embodiments and examples shown below.

[Summary]

The polycarbonate resin composition of the present invention is a composition for molding a polycarbonate resin molded article having a thin-walled section with a wall thickness of 0.6 mm or less, this polycarbonate resin composition being characterized in that the resin composition contains an oligomeric phosphoric acid ester flame retardant (B1) and/or a phosphazene flame retardant (B2), and the content of flame retardant with respect to 100 parts by mass of the polycarbonate resin (A) is:

i) 5 to 20 parts by mass when the resin composition contains only the oligomeric phosphoric acid ester flame retardant (B1);

ii) 10 to 30 parts by mass when the resin composition contains only the phosphazene flame retardant (B2); or iii) a total of 5 to 30 parts by mass when the resin composition contains both the oligomeric phosphoric acid ester flame retardant (B1) and the phosphazene flame retardant (B2), with the content ratio thereof being 1 to 49 mass % of (B1) and 99 to 51 mass % of (B2), the resin composition additionally contains 3 to 15 parts by mass of a siloxane-based core/shell elastomer (C) and 0.8 to 10 parts by mass of carbon black (D) with respect to 100 parts by mass of the polycarbonate resin (A), the siloxane-based core/shell elastomer (C) has a silicon content of 9.1 to 30 mass % and a number-average particle size in the range of 50 to 1,000 nm, and the flow rate per unit time of the resin composition is 15 to $50 \times 10^{-2}$ cm$^3$/sec.

[Polycarbonate Resin (A)]

The type of polycarbonate resin used in the polycarbonate resin composition of the present invention is not limited herein. Moreover, one type of polycarbonate resin can be used, or two or more types thereof can be used together in a desired combination and ratio.

A polycarbonate resin is a polymer with a basic structure having a carbonate linkage represented by the general formula —(—O—X$^2$—O—C(=O)—)—. In the formula, moiety X$^2$ is generally a hydrocarbon group, and an X$^2$ wherein a heteroatom or hetero bond has been introduced to impart various properties can also be used.

Moreover, polycarbonate resins can be classified into aromatic polycarbonate resins and aliphatic polycarbonate resins; in the former, the carbon atom that is bonded directly to the carbonate linkage is an aromatic carbon, and in the latter that carbon atom is an aliphatic carbon. However, any of these resins may be suitably used. This all being said, an aromatic polycarbonate resins is preferred from the viewpoint of flame resistance, mechanical properties, electrical properties and the like.

The specific type of polycarbonate resin is not limited herein, and examples include polycarbonate polymers obtained by the reaction of a dihydroxy compound with a carbonate precursor. In addition to the dihydroxy compound and the carbonate precursor, polyhydroxy compound and the like can also be involved in the reaction during that process. Moreover, a method wherein carbon dioxide as the carbonate precursor is reacted with a species of cyclic ether can also be used. The polycarbonate polymer can be either straight-chain or branched. In addition, the polycarbonate polymer can have a monomer comprising a single type of repeating unit, or it can be a copolymer having two or more types of repeating units. When a copolymer is used, it can be selected from various copolymer forms such as a random copolymer, block copolymer, and the like. Such a polycarbonate polymer is usually a thermoplastic resin.

Among the monomers that can serves as the starting material for an aromatic polycarbonate resin, examples of aromatic dihidroxy compounds include:

Dihydroxy benzenes such as 1,2-dihydroxy benzene, 1,3-dihydroxy benzene (i.e., resorcinol), and 1,4-dihydroxy benzene;

Dihydroxy biphenyls, such as 2,5-dihydroxy biphenyl, 2,2'-dihydroxy biphenyl, and 4,4'-dihydroxy biphenyl;

Dihydroxy naphthalenes, such as 2,2'-dihydroxy-1,1'-binaphthyl, 1,2-dihydroxy naphthalene, 1,3-dihydroxy naphthalene, 2,3-dihydroxy naphthalene, 1,6-dihydroxy naphthalene, 2,6-dihydroxy naphthalene, 1,7-dihydroxy naphthalene, and 2,7-dihydroxy naphthalene;

Dihydroxy diaryl ethers, such as 2,2'-dihydroxy diphenyl ether, 3,3'-dihydroxy diphenyl ether, 4,4'-dihydroxy diphenyl ether, 4,4'-dihydroxy-3,3'-dimethyl diphenyl ether, 1,4-bis(3-hydroxyphenoxy)benzene, and 1,3-bis(4-hydroxyphenoxy)benzene;

Bis(hydroxy aryl) alkanes, such as 2,2-bis(4-hydroxyphenyl) propane (namely, bisphenol A), 1,1-bis(4-hydroxyphenyl) propane, 2,2-bis(3-methyl-4-hydroxyphenyl) propane, 2,2-bis(3-methoxy-4-hydroxyphenyl) propane, 2-(4-hydroxyphenyl)-2-(3-methoxy-4-hydroxyphenyl) propane, 1,1-bis(3-tert-butyl-4-hydroxyphenyl) propane, 2,2-bis(3,5-dimethyl-4-hydroxyphenyl) propane, 2,2-bis(3-cyclohexyl-4-hydroxyphenyl) propane, 2-(4-hydroxyphenyl)-2-(3-cyclohexyl-4-hydroxyphenyl) propane, α,α'-bis(4-hydroxyphenyl)-1,4-diisopropyl benzene, 1,3-bis[2-(4-hydroxyphenyl)-2-propyl]benzene, bis(4-hydroxyphenyl) methane, bis(4-hydroxyphenyl)cyclohexyl methane, bis(4-hydroxyphenyl) phenyl methane, bis(4-hydroxyphenyl)(4-propenylphenyl) methane, bis(4-hydroxyphenyl)diphenyl methane, bis(4-hydroxyphenyl) naphthyl methane, 1,1-bis(4-hydroxyphenyl) ethane, 1,1-bis(4-hydroxyphenyl)-1-phenyl ethane 1,1-bis(4-hydroxyphenyl)-1-naphthyl ethane 1,1-bis(4-hydroxyphenyl) butane, 2,2-bis(4-hydroxyphenyl) butane, 2,2-bis(4-hydroxyphenyl)pentane, 1,1-bis(4-hydroxyphenyl) hexane, 2,2-bis(4-hydroxyphenyl) hexane, 1,1-bis(4-hydroxyphenyl) octane, 2,2-bis(4-hydroxyphenyl)

octane, 4,4-bis(4-hydroxyphenyl) heptane, 2,2-bis(4-hydroxyphenyl) nonane, 1,1-bis(4-hydroxyphenyl) decane, 1,1-bis(4-hydroxyphenyl) dodecane, and the like;

Bis(hydroxy aryl)cycloalkanes such as 1,1-bis(4-hydroxyphenyl)cyclopentane, 1,1-bis(4-hydroxyphenyl)cyclohexane, 1,1-bis(4-hydroxyphenyl)-3,3-dimethyl cyclohexane, 1,1-bis(4-hydroxyphenyl)-3,4-dimethyl cyclohexane, 1,1-bis(4-hydroxyphenyl)-3,5-dimethyl cyclohexane, 1,1-bis(4-hydroxyphenyl)-3,3,5-trimethyl cyclohexane, 1,1-bis(4-hydroxy-3,5-dimethylphenyl)-3,3,5-trimethyl cyclohexane, 1,1-bis(4-hydroxyphenyl)-3-propyl-5-methyl cyclohexane, 1,1-bis(4-hydroxyphenyl)-3-tert-butyl-cyclohexane, 1,1-bis(4-hydroxyphenyl)-4-tert-butyl-cyclohexane, 1,1-bis(4-hydroxyphenyl)-3-phenyl cyclohexane, 1,1-bis(4-hydroxyphenyl)-4-phenyl cyclohexane, and the like;

Bisphenols containing a caldo structure such as 9,9-bis(4-hydroxyphenyl) fluorene, 9,9-bis(4-hydroxy-3-methylphenyl) fluorene, and the like;

Dihydroxy diaryl sulfides such as 4,4'-dihydroxy diphenyl sulfide, 4,4'-dihydroxy-3,3'-dimethyl diphenyl sulfide, and the like;

Dihydroxy diaryl sulfoxides such as 4,4'-dihydroxy diphenyl sulfoxide, 4,4'-dihydroxy-3,3'-dimethyl diphenyl sulfoxide, and the like; and Dihydroxy diaryl sulfones such as 4,4'-dihydroxy diphenyl sulfone, 4,4'-dihydroxy-3,3'-dimethyl diphenyl sulfone, and the like.

Among these, bis(hydroxy aryl) alkanes are preferred, bis(4-hydroxy phenyl) alkanes are more preferred, and from the viewpoint of impact resistance and heat resistance, 2,2-bis(4-hydroxyphenyl) propane (i.e., bisphenol A) is particularly preferred.

One type of aromatic dihydroxy compound can be used, or two or more types thereof can be used together in a desired combination and ratio.

Examples of monomers that can serve as the starting material for aliphatic polycarbonate resins include: Alkane diols such as ethane-1,2-diol, propane-1,2-diol, propane-1,3-diol, 2,2-dimethyl propane-1,3-diol, 2-methyl-2-propyl propane-1,3-diol, butane-1,4-diol, pentane-1,5-diol, hexane-1,6-diol, decane-1,10-diol, and the like;

Cycloalkane diols such as cyclopentane-1,2-diol, cyclohexane-1,2-diol, cyclohexane-1,4-diol, 1,4-cyclohexane dimethanol, 4-(2-hydroxyethyl)cyclohexanol, 2,2,4,4-tetramethyl-cyclobutane 1,3-diol, and the like;

Glycols, such as ethylene glycol, 2,2'-oxydiethanol (i.e., diethylene glycol), triethylene glycol, propylene glycol, spiroglycol, and the like;

Aralkyl diols such as 1,2-benzene dimethanol, 1,3-benzene dimethanol, 1,4-benzene dimethanol, 1,4-benzene diethanol, 1,3-bis(2-hydroxyethoxy)benzene, 1,4-bis(2-hydroxyethoxy)benzene, 2,3-bis(hydroxymethyl) naphthalene, 1,6-bis(hydroxyethoxy) naphthalene, 4,4'-biphenyl dimethanol, 4,4'-biphenyl diethanol, 1,4-bis(2-hydroxyethoxy) biphenyl, bisphenol A bis(2-hydroxyethyl) ether, bisphenol S bis(2-hydroxyethyl) ether, and the like; and Cyclic ethers such as 1,2-epoxy ethane (i.e., ethylene oxide), 1,2-epoxy propane (i.e., propylene oxide), 1,2-epoxy cyclopentane, 1,2-epoxy cyclohexane, 1,4-epoxy cyclohexane, 1-methyl-1,2-epoxy cyclohexane, 2,3-epoxy norbornane, 1,3-epoxy propane, and the like.

Among monomers serving as starting material for an aromatic polycarbonate resin, examples of the carbonate precursor include carbonyl halides, carbonate esters, and the like. One type of carbonate precursor can be used, or two or more types thereof can be used together in a desired combination and ratio.

Specific examples of carbonyl halides include phosgene; and haloformates such as the bischloro formate forms of dihydroxy compounds, the monochloro formate forms of dihydroxy compounds, and the like.

Specific examples of carbonate esters include diaryl carbonates such as diphenyl carbonate, ditolyl carbonate and the like; dialkyl carbonates such as dimethyl carbonate, diethyl carbonate, and the like; and carbonate forms of dihydroxy compounds such as the biscarbonate forms of dihydroxy compounds, the monocarbonate forms of dihydroxy compounds, cyclic carbonates, and the like.

Polycarbonate Resin Manufacturing Process

The manufacturing process for the polycarbonate resin is not particularly limited herein, and any desired method can be used. Examples include interfacial polymerization, melt transesterification, pyridine method, ring-opening polymerization of a cyclic carbonate compound, solid phase transesterification of a prepolymer, and the like. Particularly preferred methods therefrom are explained in detail below.

Interfacial Polymerization

First the process for producing the polycarbonate resin by interfacial polymerization will be explained. In the interfacial polymerization process, first a dihydroxy compound and a carbonate precursor (preferably phosgene) are reacted in the presence of an inert organic solvent and an aqueous alkali solution while normally maintaining a pH of 9 or higher, and then interfacial polymerization is carried out in the presence of a polymerization catalyst to obtain the polycarbonate resin. A molecular weight modifier (chain terminating agent) as well as an antioxidant to prevent oxidation of the dihydroxy compound can also be present in the reaction system as needed.

Dihydroxy compounds and carbonate precursors have been listed above. The use of phosgene as the carbonate precursor is particularly preferred, and this method wherein phosgene is used is specifically called the phosgene method.

Examples of the inert organic solvent include chlorinated hydrocarbons such as dichloromethane, 1,2-dichloroethane, chloroform, monochlorobenzene, and dichlorobenzene; and aromatic hydrocarbons such as benzene, toluene, and xylene. One type of organic solvent can be used, or two or more types thereof can be used together in a desired combination and ratio.

Examples of alkali compounds that are contained in the aqueous alkali solution include alkali metal compounds such as sodium hydroxide, potassium hydroxide, lithium hydroxide, and sodium bicarbonate; as well as alkaline earth metal compounds. Sodium hydroxide and potassium hydroxide are preferred. One type of alkali compound can be used, or two or more types thereof can be used together in a desired combination and ratio.

While the concentration of alkali compounds in the aqueous alkali solution is not limited herein, usually 5 to 10 mass % is used to control the aqueous alkali solution at pH 10 to 12 during the reaction. Moreover, when bubbling in the phosgene, for example, the molar ratio of the bisphenol compound to the alkali compound is usually set to 1:1.9 or more, and preferably 1:2.0 or more, but 1:3.2 or less, and preferably 1:2.5 or less to control the aqueous phase at pH 10 to 12, preferably 10 to 11.

Examples of the polymerization catalyst include aliphatic tertiary amines such as trimethylamine, triethylamine, tributylamine, tripropylamine, trihexylamine, and the like; alicyclic tertiary amines such as N,N'-dimethyl cyclohexyl amine, N,N'-diethyl cyclohexyl amine, and the like; aromatic tertiary amines such as N,N'-dimethyl aniline, N,N'-diethyl aniline, and the like; quaternary ammonium salts such as trimethyl benzyl ammonium chloride, tetramethyl ammonium chloride, triethyl benzyl ammonium chloride, and the like; pyridine; guanine; guanidinium salts, and the like. One type of polymerization catalyst can be used, or two or more types thereof can be used together in a desired combination and ratio.

Examples of the molecular weight modifier include aromatic phenols with a monovalent, phenolic hydroxyl group; aliphatic alcohols such as methanol, butanol, and the like; mercaptans; phthalimides; and the like, and among these an aromatic phenol is preferred. Specific examples of such aromatic phenols include alkyl-substituted phenols such as m-methyl phenol, p-methyl phenol, m-propyl phenol, p-propyl phenol, p-tert-butyl phenol, p-long chain alkyl-substituted phenols, and the like; vinyl group-containing phenols such as isopropanyl phenol; epoxy group-containing phenols; and carboxyl group-containing phenols such as o-oxybenzoic acid, 2-methyl-6-hydroxy phenylacetic acid, and the like. One type of molecular weight modifier can be used, or two or more types thereof can be used together in a desired combination and ratio.

The amount of molecular weight modifier to be used is usually 0.5 moles or more per 100 moles of dihydroxy compound, and preferably 1 mole or more, but usually 50 moles or less, and preferably 30 moles or less. Setting the amount of molecular weight modifier to this range can improve thermal stability and resistance to hydrolysis of the polycarbonate resin composition.

The reaction substrate, reaction medium, catalyst, additives, and the like can be mixed together in any desired order during the reaction as long as the desired polycarbonate resin can be obtained, and a suitable order can be established as desired. For example, when phosgene is used as the carbonate precursor, the molecular weight modifier can be added at any desired time between the reaction of the dihydroxy compound with phosgene (phosgenation) and the start of the polymerization reaction.

The reaction temperature is usually set to 0 to 40° C., and the reaction time usually ranges from several minutes (for example, 10 minutes) to several hours (for example, 6 hours).

Melt Transesterification

Next the manufacturing process for the polycarbonate resin by melt transesterification will be explained. In melt transesterification, the transesterification reaction is carried out, for example, between a carbonate diester and a dihydroxy compound.

Dihydroxy compounds have been listed above.

Meanwhile, examples of the carbonate diester include dialkyl carbonate compounds such as dimethyl carbonate, diethyl carbonate, and di-tert-butyl carbonate; diphenyl carbonate; and substituted diphenyl carbonates such as ditolyl carbonate, and the like. Among these, diphenyl carbonate and substituted diphenyl carbonates are preferred, and in particular, diphenyl carbonate is even more preferred. One type of diester carbonate can be used, or two or more types thereof can be used together in a desired combination and ratio.

A desired ratio of dihydroxy compound to diester carbonate can be used, provided the target polycarbonate resin can be obtained, but the use of a mole equivalent or more of the diester carbonate per 1 mole of dihydroxy compound is preferred, and the use of 1.01 or more mole equivalents is even more preferred. However, the upper limit is usually 1.30 or fewer mole equivalents. The amount of terminal hydroxyl groups can be adjusted to the preferred range by setting such a range for the ratio of the two compounds.

The amount of terminal hydroxyl groups in the polycarbonate resin tends to greatly affect thermal stability, resistance to hydrolysis, color tone, and the like. Therefore, the amount of terminal hydroxyl groups can be adjusted as needed by any publicly known, desired method. In the transesterification reaction, a polycarbonate resin wherein the amount of terminal hydroxyl groups is adjusted can usually be obtained by adjusting the mix ratio between the diester carbonate and aromatic dihydroxy compound, and the extent of pressure reduction, etc., during the reaction. Moreover, usually the molecular weight of the resulting polycarbonate resin can also be adjusted by this procedure.

The mix ratio described above is used in a case wherein the amount of terminal hydroxyl groups is adjusted by adjusting the mix ratio of dicarbonate ester and dihydroxy compound.

A method wherein a chain terminating agent is added separately during the reaction can be noted as a more active adjustment method. Examples of the chain terminating agent during this process include, for example, monovalent phenols, monovalent carboxylic acids, diester carbonates, and the like. One type of chain terminating agent can be used, or two or more types thereof can be used together in a desired combination and ratio.

A transesterification catalyst is normally used when producing a polycarbonate resin by melt transesterification. Any desired transesterification catalyst can be used. Among these, the use of alkali metal compound and/or alkaline earth metal compound, for example, is preferred. Moreover, as an auxiliary compound, for example, a basic compound such as a basic boron compound, basic phosphorus compound, basic ammonium compound, basic amine compound, and the like can be used. One type of transesterification catalyst can be used, or two or more types thereof can be used together in a desired combination and ratio.

The reaction temperature in the melt transesterification process is usually 100 to 320° C. Moreover, the reaction is usually carried out under reduced pressure of 2 mmHg or less. The specific procedure should be one wherein a melt polycondensation reaction is carried out under the above conditions while removing byproducts such as aromatic hydroxy compounds and the like.

The melt polycondensation reaction can be carried out either by a batch process or a continuous process. When carrying out the batch process, the reaction substrate, reaction medium, catalyst, additives, and the like can be mixed together in any desired order as long as the target aromatic polycarbonate resin can be obtained, and a suitable order can be established as desired. Among these, however, carrying out the melt polycondensation by a continuous procedure is preferred in consideration of, for example, the stability of polycarbonate and polycarbonate resin composition.

A catalyst deactivator can be used as needed in the melt transesterification process. Any desired compound that neutralizes the transesterification catalyst can be used as the catalyst deactivator. Examples include sulfur-containing organic compounds and the derivatives thereof, and the like. One type of catalyst deactivator can be used, or two or more types thereof can be used together in a desired combination and ratio.

The amount of catalyst deactivator to be used should normally be 0.5 weight equivalents or more with respect to the alkali metal or alkaline earth metal contained in the transesterification catalyst and preferably 1 or more weight equivalents, but should usually be 10 or fewer weight equivalents, and preferably 5 or fewer weight equivalents. In addition, the concentration thereof should normally be 1 ppm or more with respect to the aromatic polycarbonate resin, but normally 100 ppm or less, and preferably 20 ppm or less.

Other Matters Concerning the Polycarbonate Resin

The molecular weight of the polycarbonate resin is arbitrary and can be selected and decided appropriately, but the viscosity average molecular weight [Mv] as calculated from the liquid viscosity is usually 10,000 or more, preferably 16,000 or more, and more preferably 17,000 or more; but usually 40,000 or less, preferably 30,000 or less, and more preferably 24,000 or less. The mechanical strength of the polycarbonate resin composition of the present invention can be increased even more, by setting the viscosity average molecular weight at or above the lower limit of the above range, and this is even more desirable when using the composition for an application that requires high mechanical strength. Meanwhile, the decrease in flow properties of the polycarbonate resin composition of the present invention can be controlled or improved by setting the viscosity average molecular weight at or below the upper limit of the above range, which increases the molding properties and facilitates the thin-wall molding process. Two or more types of polycarbonate resins with different viscosity average molecular weights can be mixed and used together, and in such a case a polycarbonate resin with a viscosity average molecular weight outside of the above preferred range can also be included in the mix.

The term viscosity average molecular weight [Mv] refers to a value calculated from the Schnell viscosity equation wherein the intrinsic viscosity [η] (units: dl/g) is determined by measurement with an Ubbelohde viscometer at 20° C. using methyl chloride as a solvent, i.e., $\eta=1.23\times10^{-4} Mv^{0.83}$. Moreover, the intrinsic viscosity [η] is a value calculated by the following equation after measuring the specific viscosity $[\eta_{sp}]$ in solutions of various concentrations [C] (g/dl).

$$\eta = \lim_{c \to 0} \eta_{sp}/c \qquad \text{[Mathematical formula 1]}$$

The concentration of terminal hydroxyl groups in the polycarbonate resin is arbitrary and can be selected and decided as desired, but usually will be 1,000 ppm or less, preferably 800 ppm or less, and more preferably 600 ppm or less. The residual thermal stability and color tone of the polycarbonate resin composition of the present invention can be improved even more thereby. The lower limit of the concentration, particularly in the case of a polycarbonate resin produced by melt transesterification, is usually 10 ppm or more, preferably 30 ppm or more, and more preferably 40 ppm or more. A decrease in molecular weight can be prevented and the mechanical properties of the polycarbonate resin composition can be improved even more thereby.

The units for the terminal hydroxyl group concentration herein are expressed as ppm based on the mass of the terminal hydroxyl groups with respect to the mass of the polycarbonate resin. Colorimetric analysis by the carbon tetrachloride/acetic acid procedure is used as the measurement method (see Macromol. Chem., 88, 215, 1965).

The polycarbonate resin can be used as a polycarbonate resin alone (wherein the term "polycarbonate resin alone" is not limited to a mode comprising only one type of polycarbonate resin and, for example, includes modes comprising a plurality of polycarbonate resins with different monomer formulations and molecular weights), or it can be combined and used in an alloy (mixture) of a polycarbonate resin and a different thermoplastic resin. In addition, the polycarbonate resin can constitute a copolymer having the polycarbonate resin as the main component thereof such as a copolymer comprising an oligomer or polymer containing a siloxane structure for the purpose of further increasing flame resistance and impact resistance; a copolymer comprising a monomer, oligomer, or polymer containing a phosphorus atom for the purpose of further increasing thermal oxidation stability and flame resistance; a copolymer comprising a monomer, oligomer, or polymer containing a dihydroxy anthraquinone structure for the purpose of increasing thermal oxidation stability; a copolymer comprising an oligomer or polymer containing an olefin-based structure, as represented by polystyrene, for the purpose of improving optical properties; and a copolymer comprising a polyester resin oligomer or polymer for the purpose of increasing resistance to chemicals; and the like.

The polycarbonate resin can also contain a polycarbonate oligomer for the purpose of increasing the appearance of the molded article and improving flow properties. The viscosity average molecular weight [Mv] of this polycarbonate oligomer is normally 1,500 or more, and preferably 2,000 or more, but normally 9,500 or less, and preferably 9,000 or less. In addition, preferably the content of the included polycarbonate oligomer is set to 30 mass % or less of the polycarbonate resin (including the polycarbonate oligomer).

In addition, the polycarbonate resin can be a polycarbonate resin that has been regenerated from a used manufactured product rather than one made from virgin starting materials (a so-called recycled material polycarbonate resin). Examples of used manufactured products include optical recording media such as optical disks and the like; backlights; transparent vehicle parts such as automobile window glass, automobile headlight glass, windshields, and the like; containers such as water bottles and the like; eyeglass lenses; and construction materials such as soundproof baffles, glass windows, corrugated sheets; and the like. Moreover, pulverized pieces or melted pellets obtained from defective products, sprue, runner, and the like can also be used.

It should be noted, however, that the regenerated polycarbonate resin is preferably 80 mass % or less, and more preferably 50 mass % or less, of the polycarbonate resin contained in the polycarbonate resin composition of the present invention. The regenerated polycarbonate resin will likely have undergone deterioration due to heat or aging, and if such polycarbonate resin is used in a greater amount than in the above range, the hue and mechanical properties may be adversely affected.

[Flame Retardant]

The polycarbonate resin composition of the present invention is characterized in that it contains an oligomeric phosphoric acid ester flame retardant (B1) and/or a phosphazene flame retardant (B2) as the flame retardant, wherein the content thereof with respect to 100 parts by mass of the polycarbonate resin (A) is:

i) 5 to 20 parts by mass when the resin composition contains only the oligomeric phosphoric acid ester flame retardant (B1), ii) 10 to 30 parts by mass when the resin composition contains only the phosphazene flame retardant (B2), and iii) a total of 5 to 30 parts by mass when the resin composition contains both the oligomeric phosphoric acid ester flame retardant (B1) and the phosphazene flame retardant (B2), and the content ratio thereof is 1 to 49 mass % of (B1) and 99 to 51 mass % of (B2).

[Oligomeric Phosphoric Acid Ester Flame Retardant (B1)]

A phosphoric acid ester compound represented by general formula (1) below is particularly preferred as the oligomeric phosphoric acid ester flame retardant (B1).

[Chemical Formula 2]

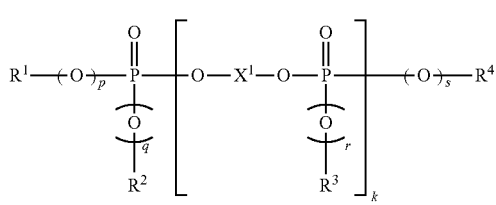

(1)

(wherein $R^1$, $R^2$, $R^3$, and $R^4$ each represent a $C_{1-6}$ alkyl group or optionally alkyl-substituted $C_{6-20}$ aryl group; p, q, r, and s each represent either 0 or 1; k is an integer from 1 to 5; and $X^1$ represents an arylene group.)

The phosphoric acid ester compound represented by general formula (1) can be a mixture of compounds having different values for k, and in such a case k represents the average value of the mixture. In the case of a mixture of compounds having different values for k, the average value for k is preferably 1 to 2, more preferably 1 to 1.5, even more preferably 1 to 1.2, and a range of 1 to 1.15 is particularly preferred.

Moreover, $X^1$ represents a divalent arylene group, and examples thereof include divalent groups derived from dihydroxy compounds such as resorcinol, hydroquinone, bisphenol A, 2,2'-dihydroxy biphenyl, 2,3'-dihydroxy biphenyl, 2,4'-dihydroxy biphenyl, 3,3'-dihydroxy biphenyl, 3,4'-dihydroxy biphenyl, 4,4'-dihydroxy biphenyl, 1,2-dihydroxy naphthalene, 1,3-dihydroxy naphthalene, 1,4-dihydroxy naphthalene, 1,5-dihydroxy naphthalene, 1,6-dihydroxy naphthalene, 1,7-dihydroxy naphthalene, 1,8-dihydroxy naphthalene, 2,3-dihydroxy naphthalene, 2,6-dihydroxy naphthalene, 2,7-dihydroxy naphthalene, and the like. Among these, divalent groups derived from resorcinol, bisphenol A, and 3'3-dihydroxy biphenyl are particularly preferred.

Moreover, p, q, r, and s in general formula (1) each represent 0 or 1, and preferably represent 1.

Moreover, $R^1$, $R^2$, $R^3$, and $R^4$ each represent a $C_{1-6}$ alkyl group or optionally alkyl-substituted $C_{6-20}$ aryl group. Examples of this kind of aryl group include a phenyl group, cresyl group, xylyl group, isopropyl phenyl group, butyl phenyl group, tert-butyl phenyl group, di-tert-butyl phenyl group, and p-cumyl phenyl group, and among these, the phenyl, cresyl, and xylyl groups are more preferred.

As concrete examples of the oligomeric phosphoric acid ester flame retardant represented by general formula (1), phenyl resorcinol polyphosphate, cresyl resorcinol polyphosphate, phenyl cresyl resorcinol polyphosphate, xylyl resorcinol polyphosphate, phenyl-p-t-butyl phenyl resorcinol polyphosphate, phenyl isopropyl phenyl resorcinol polyphosphate, cresyl xylyl resorcinol polyphosphate, phenyl isopropyl phenyl diisopropyl phenyl resorcinol polyphosphate, and the like are preferred.

The phosphoric acid ester compound represented by general formula (1) preferably has an acid value of 0.2 mg KOH/g, more preferably 0.15 mg KOH/g or less, even more preferably 0.1 mg KOH/g or less, and 0.05 mg KOH/g or less is particularly preferred. The lower limit of the acid value can be made essentially 0. Meanwhile, the half-ester content is more preferably 1.1 parts by mass or less, and 0.9 parts by mass or less is even more preferred. When the acid value exceeds 0.2 mg KOH/g and the half-ester content exceeds 1.5 mg, the polycarbonate resin composition of the present invention may undergo a decrease in thermal stability and resistance to hydrolysis.

[Phosphazene Flame Retardant (B2)]

The phosphazene flame retardant (B2) is an organic compound with an intramolecular —P=N— bond, and preferably is at least one type of compound selected from the group consisting of the cyclic phosphazene compounds represented by general formula (2) below, the chained phosphazene compounds represented by general formula (3) below, and crosslinked phosphazene compounds wherein at least one type of phosphazene compound selected from the group consisting of general formula (2) and general formula (3) below is crosslinked by a crosslinking group. A crosslinked phosphazene compound that is crosslinked by the crosslinking group represented by general formula (4) below is preferred from the standpoint of flame resistance.

The phosphazene flame retardant (B2) provides very effective flame resistance, and especially because it can be used in combination with the carbon black (D) discussed below to exhibit truly outstanding flame resistance, the loss of mechanical strength and generation of gases that can occur from blending a flame retardant into the resin composition can be controlled.

[Chemical Formula 3]

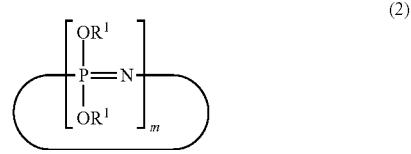

(2)

(wherein m is an integer from 3 to 25, and $R^1$ can be the same or different moieties, and represents an aryl group or alkylaryl group.)

[Chemical Formula 4]

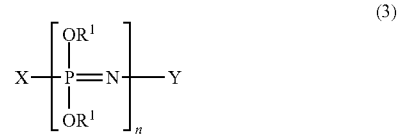

(3)

(wherein, n is an integer from 3 to 10,000; X represents an —N=P(OR$^1$)$_3$ group or —N=P(O) OR$^1$ group; Y represents a —P(OR$^1$)$_4$ group or —P(O)(OR$^1$)$_2$ group; and $R^1$ can be the same or different moieties, and represents an aryl or an alkylaryl group).

[Chemical Formula 5]

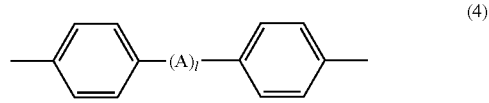

(4)

(wherein, A is —C(CH$_3$)$_2$—, —SO$_2$—, —S—, or —O—, and l is 1 or 0.)

Examples of the cyclic and/or chained phosphazene compounds represented by formulas (2) and (3) include cyclic and/or chained C$_{1-6}$ alkyl C$_{6-20}$ aryloxy phosphazenes such as phenoxyphosphazene, (poly)tolyloxyphosphazenes (for example, o-tolyloxy phosphazene, m-tolyloxy phosphazene, p-tolyloxy phosphazene, o,m-tolyloxy phosphazene, o,p-tolyloxy phosphazene, m,p-tolyloxy phosphazene, and o,m, p-tolyloxy phosphazene, etc.), (poly)xylyloxy phosphazenes, and the like; and cyclic and/or chained C$_{6-20}$ aryl C$_{1-10}$ alkyl C$_{6-20}$ aryloxy phosphazenes such as (poly)phenoxy tolyloxy phosphazenes (for example, phenoxy-o-tolyloxy phosphazene, phenoxy-m-tolyloxy phosphazene, phenoxy-p-tolyloxy phosphazene, phenoxy-o,m-tolyloxy phosphazene, phenoxy-o,p-tolyloxy phosphazene, phenoxy-m,p-tolyloxy phosphazene, and phenoxy-o,m,p-tolyloxy phosphazene), (poly)phenoxy xylyloxy phosphazene, and (poly) phenoxy tolyloxy xylyloxy phosphazene, and preferably cyclic and/or chained phenoxyphosphazenes, cyclic and/or chained C$_{1-3}$ alkyl C$_{6-20}$ aryloxy phosphazenes, and C$_{6-20}$ aryloxy C$_{1-3}$ alkyl C$_{6-20}$ aryloxy phosphazenes (for example, cyclic and/or chained tolyloxyphophazenes, cyclic and/or chained phenoxy tolylphenoxy phophazenes, and the like).

A cyclic phenoxyphophazene wherein R$^1$ is a phenyl group is particularly preferred as the cyclic phosphazene compound represented by general formula (2). Concrete examples of such cyclic phenoxyphosphazene compounds include, for example, phenoxy cyclotriphosphazene, octaphenoxy cyclotetraphosphazene, decaphenoxy cyclopentaphosphazene, and the like that are obtained by extracting a cyclic chlorophosphazene such as hexachloro cyclotriphosphazene, octachloro cyclotetraphosphazene, decachloro cyclopentaphosphazene, and the like from a cyclic or straight-chain chlorophosphazene mixture produced by reacting ammonium chloride and phosphorus pentachloride at 120 to 130° C., and then substituting the extracted cyclic chlorophosphazene with phenoxy groups. Moreover, a cyclic phenoxyphosphazene compound wherein m in general formula (2) is 3 to 5 is preferred, and a mixture of compounds with different values of m can be used. Among these, a mixture comprising 50 mass % or more of compounds wherein m=3, 10 to 40 mass % of compounds wherein m=4, and 30 mass % or less of compounds wherein m≥5 combined is preferred.

A chained phenoxy phophazene wherein R$^1$ is a phenyl group is particularly preferred as the chained phosphazene compound represented by general formula (3). Concrete examples of such chained phenoxyphosphazene compounds include, for example, compounds wherein ring-opening polymerization is carried out at 220 to 250° C. on a hexachloro cyclotriphosphazene obtained in the above manner, and the resulting straight-chain dichloro phosphazene with a degree of polymerization of 3 to 10,000 is substituted with phenoxy groups. In the straight-chain phenoxyphosphazene compound preferably n of general formula (3) is 3 to 1,000, more preferably 3 to 100, and even more preferably 3 to 25.

Crosslinked phosphazene compounds include, for example, compounds having a crosslinking structure comprising a 4,4'-diphenylene group such as compounds having the crosslinking structure of 4,4'-sulfonyl diphenylene (bisphenol S residue), compounds having the crosslinking structure of a 2,2-(4,4'diphenylene) isopropylidene group, compounds having the crosslinking structure of a 4,4'-oxydiphenylene group, compounds having the structure of a 4,4'-thiodipheneylene group, and the like.

Moreover, a crosslinked phenoxyphosphazene compound obtained by crosslinking a cyclic phenoxyphophazene compound wherein R$^1$ in general formula (2) is a phenyl group with the crosslinking group represented by general formula (4), or a crosslinked phenoxyphosphazene compound obtained by crosslinking a chained phenoxyphophazene compound wherein R$^1$ in general formula (3) is a phenyl group with the crosslinking group represented by general formula (4) is preferred from the standpoint of flame resistance, and a crosslinked phenoxyphosphazene compound obtained by crosslinking the cyclic phenoxyphosphazene compound with the crosslinking group represented by general formula (4) is even more preferred.

The phenylene group content in the crosslinked phenoxyphosphazene compound is usually 50 to 99.9%, and preferably 70 to 90%, based on the total number of phenyl groups and phenylene groups in the cyclic phosphazene compound represented by general formula (2) and/or the chained phenoxyphosphazene compound represented by general formula (3) as a standard. Moreover, a crosslinked phenoxyphosphazene compound that does not contain free hydroxyl groups is particularly preferred.

The cyclic phenoxyphosphazene compound represented by general formula (2) is preferred as the phosphazene flame retardant (B2) in the present invention from the standpoint of flame resistance and mechanical properties.

[Content of Oligomeric Phosphoric Acid Ester Flame Retardant (B1) and Phosphazene Flame Retardant (B2)]

The oligomeric phosphoric acid ester flame retardant (B1) and phosphazene flame retardant (B2) can be used alone or combined and used together, and the content thereof is:

i) 5 to 20 parts by mass with respect to 100 parts by mass of the polycarbonate resin (A) when the resin composition contains only the oligomeric phosphoric acid ester flame retardant (B1), ii) 10 to 30 parts by mass with respect to 100 parts by mass of the polycarbonate resin (A), when the resin composition contains only the phosphazene flame retardant (B2), and iii) a total of 5 to 30 parts by mass with respect to 100 parts by mass of the polycarbonate resin (A) when the resin composition contains both the oligomeric phosphoric acid ester flame retardant (B1) and the phosphazene flame retardant (B2), and the content ratio thereof is 1 to 49 mass % of (B1) and 99 to 51 mass % of (B2).

As noted above for case i), wherein the resin composition contains only the oligomeric phosphoric acid ester flame retardant (B1), the content thereof is 5 to 20 parts by mass with respect to 100 parts by mass of the polycarbonate resin (A). If the amount of oligomeric phosphoric acid ester flame retardant (B1) is less than 5 parts by mass, flame resistance will be inadequate, and if the amount exceeds 20 parts by mass, that will cause a conspicuous decrease in heat resistance and a mechanical properties. When the resin composition contains only the oligomeric phosphoric acid ester flame retardant (B1), the amount is preferably 8 parts by mass or more, and more preferably 10 parts by mass or more, but preferably 18 parts by mass or less, and more preferably 16 parts by mass or less.

As noted above for case ii), wherein the resin composition contains only the phosphazene flame retardant (B2), the content thereof is 10 to 30 parts by mass with respect to 100 parts by mass of the polycarbonate resin (A). Flame resistance can be adequately improved by setting the amount to 10 parts by mass or more, and both thermal properties and mechanical strength can be satisfactorily maintained by setting the amount to 30 parts by mass or less. Preferably the amount is 11 parts by mass or more, and even more preferably 12 parts by mass or more, but preferably 25 parts by mass or less, and more preferably 22 parts by mass or less.

As noted above for case iii), wherein the resin composition contains both the oligomeric phosphoric acid ester flame retardant (B1) and the phosphazene flame retardant (B2), the total amount of both is 5 to 30 parts by mass with respect to 100 parts by mass of the polycarbonate resin (A). If the content is less than 5 parts by mass, flame resistance will be inadequate, and if the amount exceeds 30 parts by mass, a conspicuous decrease in heat resistance and mechanical properties will occur.

Moreover, when the resin composition contains both (B1) and (B2), the content ratio thereof is 1 to 49 mass % of (B1) and 99 to 51 mass % of (B2) based on a total for (B1) and (B2) as 100 mass %. If the content ratio of (B2) drops below 51 mass %, a decrease in thermal properties and a conspicuous decrease in mechanical properties will occur. The preferred content ratio is 5 to 45 mass % of (B1) and 95 to 55 mass % of (B2).

Moreover, when resin composition contains both flame retardants, the content of the oligomeric phosphoric acid ester flame retardant (B1) with respect to 100 parts by mass of the polycarbonate resin (A) is preferably 1 part by mass or more, and preferably 20 parts by mass or less, and the content of the phosphazene flame retardant (B2) with respect to 100 parts by mass of the polycarbonate resin (A) is preferably 9 parts by mass or more and 25 parts by mass or less.

[Siloxane-Based Core/Shell Elastomer (C)]

The polycarbonate resin composition of the present invention contains a siloxane-based core/shell elastomer (C) as an elastomer, and it uses a siloxane-based core/shell elastomer with a silicon content of 9.1 to 30 mass % and a number-average particle size of 50 to 1,000 nm.

In the present invention it is possible to produce a polycarbonate resin composition having not only high flame resistance and impact resistance, but also an excellent surface appearance by using such a siloxane-based core/shell elastomer (C) together with an oligomeric phosphoric acid ester flame retardant (B1) and/or phosphazene flame retardant (B2), and carbon black (D), and by skillfully balancing the silicon content and the carbon black content in the resin composition.

A core/shell elastomer, which is particularly preferred as the siloxane-based core/shell elastomer (C), is one having a silicone-based rubber polymer as the core layer and either an acrylic polymer or copolymer component such as an acrylate, methacrylate, and the like or an acrylonitrile-styrene copolymer component as the shell layer surrounding the same.

A polyorganosiloxane, namely, a polymer comprising a dimethyl siloxane unit as a constituent unit or a polymer comprising a siloxane that contains a vinyl-polymerizable functional group as a constituent component is preferred as the silicone-based rubber that forms the core layer.

The siloxane containing a vinyl-polymerizable functional group contains a vinyl-polymerizable functional group and can be bonded to dimethyl siloxane via a siloxane bond. Among the siloxanes containing a vinyl-polymerizable functional group, various alkoxysilane compounds that contain a vinyl-polymerizable functional group are preferred in the light of their reactivity with dimethyl siloxane. One siloxane containing a vinyl-polymerizable functional group can be used alone or a mixture of two or more types thereof can be used together.

In addition, the polyorganosiloxane can be crosslinked by a siloxane-based crosslinking agent. Examples of the siloxane-based crosslinking agent include trifuncational or tetrafunctional silane-based crosslinking agents such as trimethoxy methyl silane, triethoxy phenyl silane, tetramethoxy silane, tetraethoxy silane, tetrabutoxy silane, and the like.

Examples of the component constituting the shell of the siloxane-based core/shell elastomer (C) include acrylic-based, and preferably polyalkyl (meth)acrylate polymers, and a polymer comprising an alkyl (meth)acrylate unit and a polyfunctional alkyl (meth)acrylate unit as constituents thereof is preferred.

Examples of alkyl (meth)acrylates include alkyl acrylates such as n-propyl acrylate, n-butyl acrylate, 2-ethylhexyl acrylate, and the like, and alkyl methacrylates such as 2-ethylhexyl methacrylate, n-lauryl methacrylate, and the like, and one of these can be used alone or two or more types thereof can be used together.

Examples of polyfunctional (meth)acrylates include ethylene glycol dimethacrylate, propylene glycol dimethacrylate, 1,3-butylene glycol dimethacrylate, 1,4-butylene glycol dimethacrylate, triallyl cyanurate, and the like, and one of these can be used alone or two or more types thereof can be used together.

The content of polyfunctional alkyl (meth)acrylate units is not particularly limited herein, but preferably is 0.1 to 2.0 mass %, and more preferably 0.3 to 1.0 mass % in 100 mass % of polyalkyl (meth)acrylate.

Moreover, an acrylonitrile-styrene copolymer can also be noted as a preferred component constituting the shell of the siloxane-based core/shell elastomer (C).

The method of manufacturing the siloxane-based core/shell elastomer (C) is not particularly limited herein, but a preferred manufacturing method can be noted wherein usually the alkyl (meth)acrylate component and polyfunctional alkyl (meth)acrylate component, or the acrylonitrile component and styrene component, are added into a latex of the polyorganosiloxane component, and an emulsified graft polymer is produced by using a radical polymerization initiator such as a peroxide compound, azo-based initiator, or a redox polymerization initiator that combines an oxidizing agent and a reducing agent. A redox polymerization initiator is preferred.

The number-average particle size of the siloxane-based core/shell elastomer (C) used in the present invention is 1,000 nm or less, preferably 800 nm or less, and more preferably 650 nm or less. The lower limit thereof is 50 nm or more, preferably 80 nm or more, and more preferably 100 nm or more. The impact resistance, heat resistance, and appearance of the molded article can be improved by setting the number-average particle size of the siloxane-based core/shell elastomer (C) to within such a range.

The number-average particle size of the siloxane-based core/shell elastomer (C) in the present invention is a value determined by measuring the sizes of primary particles of siloxane-based core/shell elastomer (C) dispersed in the matrix of the polycarbonate resin (A) by transmission electron microscopy (TEM).

More specifically, the method can be summarized as follows.

First 100 nm thin sections cut from pellets of the resin composition of the present invention are stained for 60 min in osmium tetroxide vapor and 60 min in ruthenium tetroxide vapor, and observed by TEM. Then using the images obtained from TEM, the sizes (mean diameter) of primary particles are measured for 50 of the siloxane-based core/shell elastomer (C) particles dispersed in the matrix, and the numerical average is used as the number-average particle size in the present invention.

Moreover, the silicon content of the siloxane-based core/shell elastomer (C) must be 9.1 to 30 mass %; the upper limit is preferably 25 mass % or less, more preferably 20 mass % or less, even more preferably 15 mass % or less, and 12 mass % or less is particularly preferred. The impact resistance, heat resistance, and appearance of the molded article can be improved by setting the silicon content to such a range. Adjustment of the silicon content can easily be carried out by adjusting the amount of silicone rubber when producing the siloxane-based core/shell elastomer (C).

The silicon content of the siloxane-based core/shell elastomer (C) is measured as a value detected by inductively coupled plasma atomic emission spectroscopy (ICP/AES).

The content of the core/shell elastomer (C) is 3 to 15 parts by mass with respect to 100 parts by mass of the polycarbonate resin (A). If the content of the of the core/shell elastomer (C) is less than 3 parts by mass, the impact resistance enhancing effect thereof is inadequate, and if the content exceeds 15 parts by mass, the flame resistance is adversely affected. The content is preferably 4 parts by mass or more, and preferably 9.7 parts by mass or less.

The content of the core/shell elastomer (C) will now be explained in greater detail below for cases i) to III) above.

In case i) wherein the resin composition contains only the oligomeric phosphoric acid ester flame retardant (B1), the content is preferably 3 to 9 parts by mass with respect to 100 parts by mass of the polycarbonate resin (A).

In case ii) wherein the resin composition contains only the phosphazene flame retardant (B2), the content is preferably 4 to 15 parts by mass with respect to 100 parts by mass of the polycarbonate resin (A).

In case iii) wherein the resin composition contains both the oligomeric phosphoric acid ester flame retardant (B1) and the phosphazene flame retardant (B2), the total amount of both is preferably 3 to 9.7 parts by mass with respect to 100 parts by mass of the polycarbonate resin (A).

[Carbon Black (D)]

The polycarbonate resin composition of the present invention contains 0.8 to 5 parts by mass of carbon black (D) with respect to 100 parts by mass of polycarbonate resin (A). As noted above, in the past it was common practice to include carbon black in the blend for the purpose of adding color, but in the present invention the carbon black is included as a component for improving flame resistance effectiveness. Therefore, the carbon black (D) of the present invention expresses even greater performance because a larger amount thereof than in the past is included, and the amount exceeds 0.8 parts by mass with respect to 100 parts by mass of the polycarbonate resin (A). In the past it was considered undesirable to increase the amount of carbon black, and the matter of using such a high amount of carbon black is specific to the resin composition of the present invention.

The type of carbon black (D) used in the present invention, the type of staring material, and the process for producing the same are not particularly limited herein, and furnace black, channel black, acetylene black, Ketjen black, and the like can all be used. The number-average particle size thereof is not particularly limited herein, but preferably is about 5 to 60 nm. Using carbon black having a number-average particle size within such a range facilitates obtaining a composition that is less likely to develop blisters at high temperatures.

Preferably the specific area measured by nitrogen absorption (units: $m^2/g$) of the carbon black (D) is usually less than 1,000 $m^2/g$, and a range of 50 to 400 $m^2/g$ is preferred. Setting the specific area measured by nitrogen absorption at less than 1,000 $m^2/g$ is preferred because it tends to improve the flow properties of the polycarbonate resin composition of the present invention and the appearance of the molded article. The specific surface area measured by nitrogen absorption can be measured in accordance with JIS K6217.

Preferably the DBP (dibutyl phthalate) absorption of the carbon black (D) is less than 300 $cm^3/100$ g, and a range of 30 to 200 $cm^3/100$ g is preferred. Setting the DBP absorption at less than 300 $m^3/100$ g is preferred because it tends to improve the flow properties of the polycarbonate resin composition of the present invention and the appearance of the molded article.

The DBP absorption (units: $cm^3/100$ g) can be measured in accordance with JIS K6217. The pH value of the carbon black used in the present invention is not particularly limited herein, but usually ranges from 2 to 10, preferably 3 to 9, and a pH value of 4 to 8 is even more preferred.

Only one type of carbon black (D) can be used, or two or more types thereof can be used together. In addition, the carbon black can be granulated using a binder, and can be used in a master batch wherein it has been melted and kneaded into another resin at a high concentration. Improved handling during extrusion and improved dispersion properties in the resin composition can be achieved by using a melt-kneaded master batch. Examples of the above resin include polystyrene resins, polycarbonate resins, acrylic resins, and the like.

As noted above, the content of the carbon black (D) is 0.8 to 5 parts by mass with respect to 100 parts by mass of the polycarbonate resin (A), but preferably is 1 part by mass or more, and 4 parts by mass or less.

The content of the carbon black (D) will now be explained below for cases i) to III) above.

In case i) wherein the resin composition contains only the oligomeric phosphoric acid ester flame retardant (B1), the content is preferably 0.8 to 5 parts by mass with respect to 100 parts by mass of the polycarbonate resin (A); it is preferable to include an amount exceeding 2 parts by mass, and an amount of 2.5 to 5 parts by mass is even more preferred.

In case ii) wherein the resin composition contains only the phosphazene flame retardant (B2), the content is preferably 1 to 10 parts by mass with respect to 100 parts by mass of the polycarbonate resin (A). More preferably, the content is 2 parts by mass or more, even more preferably 2.5 parts by mass or more, and particularly 3 parts by mass or more, but preferably 8 parts by mass or less, more preferably 6 parts by mass or less, and 5 parts by mass or less is even more preferred.

In case iii) wherein the resin composition contains both the oligomeric phosphoric acid ester flame retardant (B1) and the phosphazene flame retardant (B2), the total amount of both is preferably 0.8 to 5 parts by mass with respect to 100 parts by mass of the polycarbonate resin (A), more preferably 0.9 parts by mass or more, and even more preferably 1 part by mass or more, but more preferably 4 parts by mass or less, and 3 parts by mass or less is even more preferred.

[Fluorine-Containing Resin (E)]

The polycarbonate resin composition of the present invention preferably contains a fluoropolymer (E), and the amount is preferably 0.001 to 1 part by mass with respect to 100 parts by mass of the polycarbonate resin (A). Moreover, one type of fluoropolymer (E) can be used, or two or more types thereof can be used together in a desired combination and ratio. Including such a fluoropolymer can improve the melt properties of the resin composition and increase the anti-drip properties during combustion.

If the content of the fluoropolymer (E) is less than 0.001 parts by mass, the flame resistance improving effect is likely to be inadequate, and if it exceeds 1 part by mass, defects in the appearance and a decrease in mechanical strength of the molded article formed from a thermoplastic resin composition are likely to occur. The lower limit of content is preferably 0.01 parts by mass or more with respect to 100 parts by mass of the polycarbonate resin (A), more preferably 0.05 parts by mass or more, and 0.1 parts by mass or more is particularly preferred; the upper limit of content is preferably 0.9 parts by mass or less, more preferably 0.8 parts by mass or less, and 0.6 parts by mass or less is particularly preferred.

A fluorinated olefin resin is preferred as the fluoropolymer (E). A fluorinated olefin resin is usually a polymer or copolymer containing a fluoroethylene structure, and concrete examples thereof include difluoroethylene resins, tetrafluoroethylene resins, tetrafluoroethylene-hexafluoropropylene copolymer resins, and the like; among these a tetrafluoroethylene resin is preferred.

Moreover, a fluorine-containing resin with fibril-forming capability is preferred, and a concrete example is a fluorinated olefin resin with fibril-forming capability. The anti-drip properties during combustion tend to improve conspicuously by using a resin with fibril-forming capability.

Moreover, an organic polymer-coated fluorinated olefin resin can be suitably used as the fluoropolymer (E). The dispersion properties can be increased, the surface appearance of the molded article can be improved, and the presence of foreign matter in surface be controlled by using an organic polymer-coated fluorinated olefin resin. The organic polymer coated-fluorinated olefin resin can be produced by various publicly known methods, for example: (1) a process wherein an aqueous dispersion of poly(fluoro-olefin) resin particles and an aqueous dispersion of organic polymer particles are mixed, and a powder thereof is produced by coagulation or spray drying; (2) a process wherein monomers constituting the organic polymer are polymerized in the presence of an aqueous dispersion of poly(fluoro-olefin) particles, and then a powder thereof is produced by coagulation or spray drying; (3)monomers having an ethylenically unsaturated bond are emulsion polymerized in a liquid dispersion comprising an aqueous dispersion of poly(fluoro-olefin) particles and an aqueous dispersion of organic polymer particle, and then a powder thereof is produced by coagulation or spray drying; and the like.

From the standpoint of dispersion properties when mixing the same into the polycarbonate resin, monomers for forming the organic polymer to coat the fluoro-olefin resin preferably will have high affinity with the polycarbonate resin, and aromatic vinyl monomers, (meth)acrylic acid ester monomers, or cyanidated vinyl monomers are more preferred.

[Phosphorus-Based Stabilizer]

Preferably the polycarbonate resin composition of the present invention contains a phosphorus-based stabilizer. Any publicly known, phosphorus-based stabilizer can be used as desired. Specific examples thereof include oxo-acids of phosphorus such as phosphoric acid, phosphonic acid, phosphorus acid, phosphinic acid, polyphosphorus acid, and the like; metal salts of acid pyrophosphate such as sodium acid pyrophosphate, potassium acid pyrophosphate, calcium acid pyrophosphate, and the like; phosphates of Group I or Group 2B metals such as potassium phosphate, sodium phosphate, cesium phosphate, zinc phosphate, and the like; organic phosphate compounds, organic phosphite compounds, organic phosphonite compounds and the like, but an organic phosphite compound is preferred.

Examples of the organic phosphite compounds include triphenyl phosphite, tris(monononyl phenyl)phosphite, tris(monononyl/dinonyl phenyl)phosphite, tris(2,4-di-tert-butyl phenyl)phosphite, mono-octyl diphenyl phosphite, dioctyl monophenyl phosphite, monodecyl diphenyl phosphite, didecyl monophenyl phosphite, tridecyl phosphite, trilauryl phosphite, tristearyl phosphite, 2,2-methylenebis(4,6-di-tert-butyl phenyl) octyl phosphite, and the like. Concrete examples of such organic phosphite compounds include "Adekastab 1178," "Adekastab 2112," and "Adekastab HP10" from ADEKA Corporation; "JP-351," "JP-360," and "JP-3CP" from Johoku Chemical Co. Ltd.; "Irgafos 168" from BASF Corporation; and the like.

Moreover, one type of phosphorus-based stabilizer can be used, or two or more types thereof can be used together in a desired combination and ratio.

The content of the phosphorus-based stabilizer is usually 0.001 parts by mass or more with respect to 100 parts by mass of the polycarbonate resin (A), preferably 0.01 parts by mass or more, and more preferably 0.03 parts by mass or more, but usually 1 part by mass or less, preferably 0.7 parts by mass or less, and 0.5 parts by mass or less is even more preferred. If the content of the phosphorus-based stabilizer is below the lower limit of the above range, the thermal stabilizing effect can be inadequate, and if the content of the phosphorus-based stabilizer exceeds the upper limit of the above range, the effectiveness reaches a plateau and may not be cost efficient.

[Phenol-Based Stabilizer]

Preferably the polycarbonate resin composition of the present invention contains a phenol-based stabilizer. A hindered phenol antioxidant is an example of a phenol-based stabilizer. Concrete examples thereof include pentaerythritol tetrakis[3-(3,5-di-tert-butyl-4-hydroxyphenyl)propionate], octadecyl-3-(3,5-di-tert-butyl-4-hydroxyphenyl) propionate, thiodiethylene bis[3-(3,5-di-tert-butyl-4-hydroxyphenyl) propionate], N,N'-(hexane-1,6-diyl)bis[3-(3,5-di-tert-butyl-4-hydroxyphenyl) propionamide], 2,4-dimethyl-6-(1-methylpentadecyl) phenol, diethyl[[3,5-bis(1,1-dimethylethyl)-4-hydroxyphenyl]methyl]phosphate, 3,3',3",5,5',5"-hexa-tert-butyl-a,a',a"-(mesitylene-2,4,6-triyl)tri-p-cresol, 4,6-bis(octyl thiomethyl)-o-cresol, ethylene bis(oxyethylene)bis[3-(5-tert-butyl-4-hydroxy-m-tolyl) propionate], hexamethylene bis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-yl amino) phenol, 2-[1-(2-hydroxy-3,5-di-tert-pentyl phenyl)ethyl]-4,6-di-tert-pentyl phenyl acrylate, and the like.

Among these, pentaerythritol tetrakis[3-(3,5-di-tert-butyl-4-hydroxy phenyl) propionate], and octadecyl-3-(3,5-di-tert-butyl-4-hydroxyphenyl) propionate are preferred. Concrete examples of such phenol-based antioxidants include "Irganox 1010" and "Irganox 1076" from BASF Corporation, "Adekastab AO-50" and "Adekastab AO-60" from ADEKA Corporation, and the like.

Moreover, one type of phenol-based stabilizer can be used, or two or more types thereof can be used together in a desired combination and ratio.

The content of the phenol-based stabilizer is usually 0.001 parts by mass or more with respect to 100 parts by mass of the polycarbonate resin (A), preferably 0.01 parts by mass or more, but usually 1 part by mass or less, and 0.5 parts by mass or less is preferred. If the content of the phenol-based stabilizer is below the lower limit of the above range, the effectiveness thereof as a phenol-based stabilizer can be inadequate, and if the content of the phenol-based stabilizer exceeds the upper limit of the above range, the effectiveness reaches a plateau and may not be cost efficient.

[Lubricant (Mold Release Agent)]

Preferably the polycarbonate resin composition of the present invention contains a lubricant (mold release agent). Examples of lubricants include aliphatic carboxylic acids, esters formed from an aliphatic carboxylic acid and an alcohol, aliphatic hydrocarbons with a number-average molecular weight of 200 to 15,000, and polysiloxane-based silicone oils.

Examples of the aliphatic carboxylic acid include saturated or unsaturated monovalent, divalent, and trivalent carboxylic acids. In this case, the term aliphatic carboxylic acid also includes alicyclic carboxylic acids. Among these, preferred aliphatic carboxylic acids are $C_{6-36}$ monovalent or divalent carboxylic acids, and $C_{6-36}$ aliphatic, saturated, monovalent carboxylic acids are even more preferred. Specific examples of the aliphatic carboxylic acids include palmitic acid, stearic acid, caproic acid, capric acid, lauric acid, arachic acid, behenic acid, lignoceric acid, cerotic acid, melissic acid, tetratriacontanic acid, montanic acid, adipic acid, and azelaic acid.

The same aliphatic carboxylic acids above can be used, for example, as an aliphatic carboxylic acid in an ester formed by an aliphatic carboxylic acid and an alcohol. Meanwhile, examples of the alcohol include saturated or unsaturated monohydric and polyhydric alcohols. Such alcohols can also have a substituent such as a fluorine atom, aryl group, and the like. Among these, preferably the substituent is a saturated $C_{30}$ or shorter monohydric or polyhydric alcohol, and a $C_{30}$ or shorter saturated aliphatic monohydric or polyhydric alcohol is even more preferred. The term aliphatic as used herein also includes alicyclic compounds.

Specific examples of the alcohol include octanol, decanol, dodecanol, stearyl alcohol, behenyl alcohol, ethylene glycol, diethylene glycol, glycerin, pentaerythritol, 2,2-dihydroxy perfluoropropanol, neopentylene glycol, ditrimethylol propane, and dipentaerythritol.

The ester can also contain an aliphatic carboxylic acid and/or alcohol as an impurity. Moreover, the ester can be either a pure substance, or a mixture of a plurality of compounds. In addition, one type each of the aliphatic carboxylic acid and alcohol that bond together and constitute a single ester can be used, or two or more types thereof can be used together in a desired combination and ratio.

Specific examples of the ester formed by the aliphatic carboxylic acid and the alcohol include beeswax (a mixture mainly composed of myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate, pentaerythritol tetrastearate, and the like.

Examples of the aliphatic hydrocarbon having a number-average molecular weight of 200 to 15,000 include liquid paraffin, paraffin wax, microcrystalline wax, polyethylene wax, Fischer-Tropsch wax, $C_{3-12}$ α-olefin oligomers, and the like. The term aliphatic hydrocarbon used herein also includes alicyclic hydrocarbons. Moreover, these hydrocarbons can be partially oxidized.

Among these, paraffin wax, polyethylene wax, or partially oxidized polyethylene wax are preferred, and paraffin wax and polyethylene wax are even more preferred.

Moreover, the number-average molecular weight of the aliphatic hydrocarbon is preferably 5,000 or less.

The aliphatic hydrocarbon can be a single substance, but a mixture thereof with various constituents and molecular weights can also be used, provided the main constituents lie within the above range.

Examples of the polysiloxane-based silicone oils include dimethyl silicone oil, methyl phenyl silicone oil, diphenyl silicone oil, fluorinated alkyl silicone, and the like.

Moreover, one type of lubricant can be used, or two or more types thereof can be used together in a desired combination and ratio.

The content of the lubricant is usually 0.001 parts by mass or more with respect to 100 parts by mass of the polycarbonate resin (A), preferably 0.01 parts by mass or more, but usually 2 parts by mass or less, and 1 part by mass or less is preferred. If the content of the lubricant is below the lower limit of the above range, the mold-releasing effect may be inadequate, and if the content of lubricant exceeds the upper limit thereof, a decrease in hydrolysis resistance, and fouling of the mold during injection molding, etc., can occur.

[Other Ingredients]

The polycarbonate resin composition of the present invention can also contain ingredients other than those described above as needed, provided the desired properties of the resin composition are not significantly compromised. Examples of other ingredients include resins other than a polycarbonate resin, various resin additives, and the like. Moreover, one type of other ingredient can be used, or two or more types thereof can be used together in a desired combination and ratio.

Other Resins

Examples of other resins include thermoplastic polyester resins such as polyethylene terephthalate resin, polytrimethylene terephthalate resin, polybutylene terephthalate resin, and the like; styrene-based resins such as polystyrene resin, high-impact polystyrene resin (HIPS), acrylonitrile-styrene copolymer (AS resin), and the like; polyolefin resins such as polyethylene resin, polypropylene resin, and the like; polyamide resins; polyimide resins; polyether imide resins; polyurethane resins; polyphenylene ether resins; polyphenylene sulfide resins; polysulfone resins; polymethacrylate resins, and the like.

Moreover, one type of other resin can be used, or two or more types thereof can be used together in a desired combination and ratio.

Resin Additives

Examples of resin additives include UV absorbers, dyes and pigments, antistatic agents, anticlouding agents, antiblocking agents, flow improvers, plasticizers, dispersing agents, antibacterial agents, and the like. Moreover, one type of resin additive can be used, or two or more types thereof can be used together in a desired combination and ratio.

Specific examples of preferred additives to the polycarbonate resin composition of the present invention are described below.

UV Absorber

Examples of the UV absorber include inorganic UV absorbers such as cerium oxide and zinc oxide; and organic UV absorbers such as benzotriazole compounds, benzophenone compounds, salicylate compounds, cyanoacrylate compounds, triazine compounds, oxanilide compounds, malonic ester compounds, hindered amine compounds, and the like. Among these, organic UV absorbers are preferred, and benzotriazole compounds are particularly preferred. The transparency and mechanical properties of the polycarbonate resin composition of the present invention are improved by selecting an organic UV absorber.

Specific examples of the benzotriazole compound include 2-(2'-hydroxy-5'-methyl phenyl)benzotriazole, 2-[2'-hydroxy-3',5'-bis(α,α-dimethyl benzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole), 2-(2'-hydroxy-3',5'-di-tert-amyl)-benzotriazole, 2-(2'-hydroxy-5'-tert-octylphenyl)benzotriazole, 2,2'-methylene bis[4-(1,1,3,3-tetramethylbutyl)-6-(2N-benzotriazol-2-yl)phenol], and the like. Among these 2-(2'-hydroxy-5'-tert-octylphenyl)benzotriazole, and 2,2'-methylene bis[4-(1,1,3,3-tetramethyl butyl)-6-(2N-benzotriazole-2-yl)phenol] are preferred, and 2-(2'-hydroxy-5'-tert-octylphenyl)benzotriazole is particularly preferred.

Concrete examples of such benzotriazole compounds include "Seesorb 701," "Seesorb 705," "Seesorb 703," "Seesorb 702," "Seesorb 704," and "Seesorb 709" from Shiprokasei Kaisha, Ltd.; "Biosorb 520," "Biosorb 582," "Biosorb 580," and "Biosorb 583" from Kyodo Chemical Co. Ltd.; "Kemisorb 71" and "Kemisorb 72" from Chemipro Kasei Kaisha, Ltd.; "Cyasorb UV5411" from Cytec Industries Inc.; "LA-32," "LA-38," "LA-36," "LA-34," and "LA-31" from ADEKA Corporation; and "Tinuvin P," "Tinuvin 234," "Tinuvin 326," "Tinuvin 327," and "Tinuvin 328" from BASF Corporation.

Specific examples of the benzophenone compound include 2,4-dihydroxybenzophenone, 2-hydroxy-4-methoxybenzophenone, 2-hydroxy-4-methoxy benzophenone-5-sulfonic acid, 2-hydroxy-4-n-octoxy benzophenone, 2-hydroxy-n-dodecyloxybenzophenone, bis(5-benzoyl-4-hydroxy-2-methoxyphenyl) methane, 2,2'-dihydroxy-4-methoxybenzophenone, 2,2'-dihydroxy-4,4'-dimethoxybenzophenone, and the like. Concrete examples of such benzophenone compounds include "Seesorb 100," "Seesorb 101," "Seesorb 101S," "Seesorb 102" and "Seesorb 103" from Shiprokasei Kaisha, Ltd.; "Biosorb 100," "Biosorb 110" and "Biosorb 130" from Kyodo Chemical Co. Ltd.; "Kemisorb 10," "Kemisorb 11," "Kemisorb 11S," "Kemisorb 12," "Kemisorb 13" and "Kemisorb 111" from Chemipro Kasei Kaisha, Ltd.; "Uvinul 400," "Uvinul M-40" and "Uvinul MS-40" from BASF Corporation; "Cyasorb UV9," "Cyasorb UV284," "Cyasorb UV531" and "Cyasorb UV24" from Cytec Industries Inc.; and "Adekastab 1413" and "Adekastab LA-51" from ADEKA Corporation, and the like.

Specific examples of the salicylate compound include phenyl salicylate and 4-tert-butylphenyl salicylate, and concrete examples of such salicylate compounds include "Seesorb 201" and "Seesorb 202" from Shiprokasei Kaisha, Ltd.; "Kemisorb 21" and "Kemisorb 22" from Chemipro Kasei Kaisha, Ltd., and the like.

Specific examples of the cyanoacrylate compound include ethyl-2-cyano-3,3-diphenyl acrylate, and 2-ethylhexyl-2-cyano-3,3-diphenyl acrylate, and concrete examples of such cyanoacrylate compounds include "Seesorb 501" from Shiprokasei Kaisha, Ltd.; "Biosorb 910" from Kyodo Chemical Co. Ltd.; "Uvisolator 300" from Daiichi Kasei Co. Ltd.; "Uvinul N-35" and "Uvinul N-539" from BASF Corporation, and the like.

Examples of the triazine compound include those having a 1,3,5-triazine skeleton, and concrete examples of such triazine compounds include "LA-46" from ADEKA Corporation; and "Tinuvin 1577ED," "Tinuvin 400," "Tinuvin 405," "Tinuvin 460," "Tinuvin 477-DW" and "Tinuvin 479" from BASF Corporation.

Specific examples of the oxanilide compound include bis anilides of 2-ethoxy-2'-ethyl-oxalanic acid, and concrete examples of such oxanilide compounds include "Sanduvor VSU" from Clariant Corp.

The malonic ester compound is preferably a 2-(alkylidene) malonic acid ester, and more preferably a 2-(1-arylalkylidene) malonic acid ester. Specific examples of such malonic acid esters include "PR-25" from Clariant Corp., "B-CAP" from BASF Corporation, and the like.

The content of the UV absorber is usually 0.01 parts by mass or more with respect to 100 parts by mass of the polycarbonate resin (A), preferably 0.1 parts by mass or more, but usually 3 parts by mass or less, and 1 part by mass or less is preferred. If the content of the UV absorber is below the lower limit of the above range, the improved weathering effect can be inadequate, and if the content thereof exceeds the upper limit of the above range, mold deposits are generated that can bring about fouling of the mold. Moreover, one type of UV absorber can be used, or two or more types thereof can be used together in a desired combination and ratio.

Dyes and Pigments

Examples of dyes and pigments include inorganic pigments, organic pigments, organic dyes, and the like.

Examples of the inorganic pigments include sulfide-based pigments such as cadmium red, cadmium yellow, and the like; silicate-based pigments such as ultramarine and the like; oxide-based pigments such as titanium oxide, zinc oxide, red iron oxide, chromium oxide, iron black, titanium yellow, zinc iron brown, titanium cobalt green, cobalt green, cobalt blue, copper chromite black, copper iron black, and the like; chromate-based pigments such as chrome yellow, molybdate orange, and the like; and ferrocyanide-based pigments such as Prussian blue.

Examples of the organic pigments and dyes include phthalocyanine-based dyes and pigments such as copper phthalocyanine blue, copper phthalocyanine green, and the like; azo-based dyes and pigments such as nickel azo yellow and the like; condensed polycyclic dyes pigments such as thioindigo-based, perinone-based, perylene-based, quinacridone-based, dioxazine-based, isoindolinone-based, quinophthalone-based compounds, and the like; and anthraquinone-based, heterocyclic, and methyl-based dyes and pigments, and the like.

Among these, titanium oxide and cyanine-based, quinoline-based, anthraquinone-based, and phthalocyanine-based compounds are preferred from the standpoint of thermal stability.

Moreover, one type of dye and pigment can be used, or two or more types thereof can be used together in a desired combination and ratio.

The content of the dye and pigment is usually 5 parts by mass or less with respect to 100 parts by mass of the polycarbonate resin (A), preferably 3 parts by mass or less, and more preferably 2 parts by mass or less. If the content of dye and pigment is too large, the impact resistance can become inadequate.

[Process for Producing the Polycarbonate Resin Composition]

The process for producing the polycarbonate resin composition of the present invention is not particularly limited herein, and a broad range of publicly known processes for producing a polycarbonate resin composition can be used.

As a concrete example, a method can be used wherein the polycarbonate resin (A), oligomeric phosphoric acid ester flame retardant (B1), phosphazene flame retardant (B2), siloxane-based core/shell elastomer (C) and carbon black (D), as well as other ingredients to be included as needed, are pre-mixed using various mixers such as a tumbler, Henschel mixer, and the like, and then melted and kneaded in a mixer such as a Banbury mixer, roll mixer, Brabender, single-screw kneading extruder, double-screw kneading extruder, kneader, and the like.

Moreover, the polycarbonate resin composition of the present invention can be produced by feeding the ingredients into an extruder in use of a feeder, without premixing or after premixing only a part thereof, and melt-kneading.

Furthermore, the polycarbonate resin composition of the present invention can be produced by preparing a resin composition master batch obtained by premixing some of the ingredients, feeding the same into an extruder and melt-kneading, and then mixing the master batch once again with the remaining ingredients, and melt-kneading.

Dispersibility can be increased when mixing ingredients that do not disperse easily by dissolving or dispersing such ingredients in water or a solvent such as an organic solvent beforehand, and then kneading the solution or dispersion thereof.

[Flow Rate Per Unit Time (Q Value) of the Resin Composition]

The flow rate per unit time (Q value) of the polycarbonate resin composition of the present invention is $15 \times 10^{-2}$ to $50 \times 10^{-2}$ cm$^3$/sec when measured using an overhead flow tester at 280° C. with a load of 160 kgf/cm$^2$ in accordance with the method described in JIS K7210 Appendix C. Preferably the Q value is $18 \times 10^{-2}$ to $40 \times 10^{-2}$ cm$^3$/sec, and more preferably $20 \times 10^{-2}$ to $30 \times 10^{-2}$ cm$^3$/sec Setting the Q value within such a range enables a thin-walled polycarbonate resin molded article to be formed in a mode that provides high flame resistance and impact resistance, and an excellent surface appearance.

The Q value can be adjusted on a basis of a well-known method, for example, by selecting the type and content of the polycarbonate resin (A), the siloxane-based core/shell elastomer (C), and by adjusting the melt-kneading conditions.

[Molded Article]

The resulting polycarbonate resin composition is to be used for a molded article with a thin wall of 0.6 mm or less in thickness. A wall thickness on the level of 0.6 mm or less becomes possible because the polycarbonate resin composition of the present invention has excellent flow properties, especially thin-wall flow properties. The thickness of the thin-walled section is preferably 0.5 mm or less, more preferably 0.4 mm or less, and the upper limit thereof is usually 0.2 mm or more.

The molded article comprising a thin-walled section should have, at least in part, a thin-walled section of 0.6 mm or less, but the shape, dimensions, and the like thereof are not limited herein.

Examples of the molded article include electric and electronic devices, office automation equipment, data terminal devices, machine components, home appliances, vehicle parts, construction materials, various containers, articles for leisure-time amusement, sundries, parts for lighting equipment, and so on. Among these, the molded article is especially well suited for use in parts of electric and electronic devices, office automation equipment, data terminal devices, home appliances, lighting equipment and the like, and the use thereof in parts of electric and electronic devices is particularly preferred.

Examples of the electric and electronic devices include personal computers, gaming equipment, televisions, display devices such as electronic paper, printers, copiers, scanners, fax machines, electronic notebooks and PDAs, desktop electronic calculators, electronic dictionaries, cameras, video cameras, mobile telephones, tablet-type terminals, touch panel terminals, battery packs for such devices, drives and read-write devices for recording media, computer mice, numeric keypads, CD players, MD players, portable radios, audio players, and the like. Among these the molded article can be preferably used for the frame or housing of a battery pack for a mobile device typified by a tablet-type terminal device or a touch panel-type terminal.

The process for producing the molded article can employ a desired molding method that is generally used for a polycarbonate resin composition. Examples thereof include hollow molding processes such as injection molding, ultra-high speed injection molding, injection compression molding, two color molding, gas assisted molding, and the like; and molding methods using an insulated runner mold, molding methods using a rapid heating die, foam molding (including supercritical fluid), insert molding, IMC (in-mold coating) molding, extrusion molding, sheet molding, thermoforming, rotational molding, laminate molding, press molding, blow molding, and the like. Molding methods using a hot runner system can also be used. Among these, injection molding methods such as injection molding, ultra-high speed injection molding, injection compression molding, and the like are preferred.

A mold constructed with a material wherein the molding surface inside the cavity has a thermal conductance of 0.3 to 6.3 W/m·K (hereinafter, also called an "insulated runner mold") is particularly preferred for forming the molded article comprising a thin-walled section using the polycarbonate resin composition of the present invention. Using such an insulated runner mold can prevent the blended ingredients from floating to the surface of the molded article as a result of rapid cooling of the resin composition in the mold cavity during thin wall forming, can form a transparent resin layer on surface layer of the molded article, and can increase transcription of the mold surface; as a result, it is possible to increase the transparency and improve the appearance of the molded article even more.

Preferably, such an insulated runner mold is constructed with a material wherein the molding surface, which is the molding surface within the cavity and corresponds to at least the maximum surface area among the surfaces constituting the contour of the outer surface of the resin molded article, has a thermal conductance of 0.3 to 6.3 W/m·K. Examples include one wherein the inner surface of the cavity is coated with a material having the above thermal conductance, for example, a material from among various ceramics selected from the group consisting of zirconia-based materials, alumina-based materials, and $K_2O$—$TiO_2$ or a type of glass selected from the group consisting of soda glass, quartz glass, heat-resistant glass, crystalline glass, and the like. Concrete examples of the ceramic include $ZrO_2$, $ZrO_2$—$CaO$, $ZrO_2$—$Y_2O_3$, $ZrO_2$—$MgO$, $ZrO_2$—$SiO_2$, $K_2O$—$TiO_2$, $Al_2O_3$, $Al_2O_3$—$TiC$, $Ti_3N_2$, $3Al_2O_3$-$2SiO_2$, $MgO$—$SiO_2$, $2MgO$—$SiO_2$, $MgO$—$Al_2O_3$—$SiO$, and the like, and any material selected from the group consisting of $ZrO_2$, $ZrO_2$—$Y_2O_3$, quartz glass, and crystalline glass is preferred as a coating material.

The coating material can have any type of structure, for example, a painted structure, flame sprayed structure, or pasted structure (i.e., a liner type) according to the type of material used. The thickness of the coating material will depend on the thermal conductance and the above structure, but is usually 0.1 to 10 mm, preferably 0.5 to 5 mm. The surface roughness of the coating material will usually have an Rz value (10 point mean roughness) of 0.01 to 1.5 μm.

A metal layer can also be provided to increase the resistance of the mold surface layer to marring and increase surface hardness. In such a case, the metal layer can comprise at least one type of material selected from the group consisting of chromium materials such as chromium and chromium alloys, copper materials such as copper and copper alloys, and nickel materials such as nickel and nickel alloys, and the metal layer can be constructed from a single layer or a plurality of layers. A concrete example of a chromium alloy is a nickel-chromium alloy. Concrete examples of a copper alloy include copper-zinc-lead alloys, copper-cadmium alloys, and copper-tin alloys. In addition, concrete examples of a nickel alloy include nickel-phosphorus alloys (Ni—P-based alloys), nickel-iron alloys, nickel-cobalt alloys, nickel-tin alloys, nickel-iron-phosphorus alloys (Ni—Fe—P-based alloys), and nickel-cobalt-phosphorus alloys (Ni—Co—P-based alloys). When a high level of abrasion resistance is required of the metal layer, constructing the metal layer, for example, of a chromium (Cr) material is preferred. Meanwhile, if a moderate amount of abrasion resistance is required of the metal layer, but thickness is required, constructing the metal layer of a copper (Cu) material, for example, is preferred. In addition, if a certain amount of abrasion resistance is required of the metal layer, and thickness is also required, then constructing the metal layer of a nickel (Ni) material, for example, is preferred. Furthermore, if thickness of the metal layer is required, and surface hardness is also required, making the metal layer a two-layer structure, for example, constructing the bottom layer of a copper (Cu) material or nickel (Ni) material to a desired thickness, adjusting the thickness, and then constructing the top layer of a thin chromium (Cr) material is preferred.

EXAMPLES

The present invention is explained more concretely below through examples. However, the present invention is by no means limited to the following examples.

In the following explanation, the term "parts" refers to "parts by mass" on the basis of a standard mass unless otherwise stated.

The ingredients used in the Examples and Comparative Examples are shown in Table 1 below.

TABLE 1

| Ingredient | Symbol | |
|---|---|---|
| Polycarbonate resin | A1 | Aromatic polycarbonate resin derived from bisphenol A and prepared by interfacial polymerization, viscosity-average: 21,000, trade name: Iupilon ® S3000, from Mitsubishi Engineering-Plastics Corporation |
| | A2 | Aromatic polycarbonate resin derived from bisphenol A and prepared by interfacial polymerization, viscosity average: 27,000, trade name: Iupilon ® E2000, from Mitsubishi Engineering-Plastics Corporation |
| Oligomeric phosphoric acid ester flame retardant | B1 | Resorcinol bis-2,6-xylenyl phosphate |
| Phosphazene flame retardant | B2 | Cyclic phosphazene Hexa(phenoxy) cyclotriphosphazene |
| Siloxane-based core/shell elastomer | C1 | Core/shell elastomer prepared by graft polymerization of acrylate polymer onto rubber polymer comprising siloxane-based copolymer Si content: 9.5 mass %, number-average particle size: 110 nm |
| | C2 | Core/shell elastomer prepared by graft polymerization of acrylate polymer onto rubber polymer comprising siloxane-based copolymer Si content: 10.1 mass %, number-average particle size: 620 nm |
| Diene-based elastomer | C3 | Copolymer prepared by graft polymerization of acrylate polymer onto rubber polymer comprising crosslinked butadiene-based polymer |
| Carbon black | D | Trade name: #1000 ® from Mitsubishi Chemical Corporation |
| Fluorine-containing resin | E | Polytetrafluoroethylene, trade name: Polyflon ® FA-500B from Daikin Industries. Ltd. |
| Thermostabilizer | F1 | Tris(2,4-di-tert-butyl phenyl) phosphate, trade name: Adekastab ® 2122 from ADEKA Corporation |
| | F2 | Pentaerythritol tetrakis [3-3,5-di-tert-butyl-4-hydroxy phenyl) propionate, trade name: Irganox ® 1010 from BASF Corporation |
| Lubricant | G | Stearyl stearate, trade name Unister ® M-9676 from NOF Corporation |

[Production of Resin Pellets]

The ingredients listed in Table 1 were mixed in a tumbler for 20 minutes according to the ratios (by mass) listed in the following tables. The mixture was then fed to a single-vented, double-screw extruder (TEX30HSST) from Japan Steel Works, Ltd., kneaded under the conditions of a screw rotation rate of 200 rpm, ejection rate of 15 kg/hour, and a barrel temperature of 280° C. The molten resin was extruded in strands, rapidly cooled in a water bath, and pelletized using a pelletizer to obtain pellets of the polycarbonate resin composition.

[Flame Resistance Evaluation: UL94 Test]

After pellets obtained in the above manufacturing process were dried for 5 hours at 80° C., they were injection molded using an insulated runner mold wherein the molding surface had been coated with a zirconia ceramic in an injection molding machine model SE100DU from Sumitomo Heavy Industries, Ltd., at a mold temperature of 90° C. and a cylinder temperature of 290° C. to form UL test pieces 125 mm long, 13 mm wide, and 0.5 mm thick.

The flame resistance of the polycarbonate resin compositions was evaluated using the criteria of the UL94 test (the Standard Flammability of Plastic Materials for Parts in Devices and Appliances) specified by American Underwriters Laboratories (UL). The humidity of the UL test pieces obtained in the above manner was adjusted in a constant temperature room at 23° C. and a humidity of 50% for 48 hours.

UL94 is a method for evaluating flame resistance of a vertically held test piece of a predetermined size that is brought into contact with a burner flame for 10 seconds, and then the flame resistance is evaluated based on afterflame time and dripping. The criteria shown in Table 2 below must be satisfied to achieve the flame resistance represented by V-0, V-1 and V-2.

TABLE 2

|  | V-0 | V-1 | V-2 |
|---|---|---|---|
| Individual test sample afterflame time | 10 sec or less | 30 sec or less | 30 sec or less |
| Total afterflame time of 5 test pieces | 50 sec or less | 250 sec or less | 250 sec or less |
| Ignition of cotton due to dripping | No | No | Yes |

The afterflame time herein refers to the length of time that the test piece continues to burn with a flame after the ignition source has been removed. Ignition of cotton due to dripping is determined on the basis of whether marker cotton, which is arranged 300 mm below the lower edge of the test piece, would be ignited by dripping matter (drips) from the test piece. If only one of five test samples does not satisfy the above criteria, the material is considered to fail classification V-2 and is evaluated as NR (not rated).

In the tables this is expressed as "UL flame resistance."

[Evaluation of Appearance of Molded Article]

The UL test pieces obtained above (0.5 mm thick) were inspected visually and the appearance was evaluated by the following criteria.

◯: Satisfactory low-gloss property x: Glossy, unacceptable

In the tables this evaluation is expressed as "appearance."

[Impact Resistance Evaluation: Charpy Impact Strength (Units: $kJ/m^2$)]

Impact resistance was measured by the following procedure in accordance with ISO 179-1 and ISO 179-2.

In accordance with ISO 179-1 and 179-2, 3 mm thick notched impact resistance test pieces were produced from the pellets using with an injection molding machine model SG75MII from Sumitomo Heavy Industries, Ltd., with a molding cycle of 45 seconds at a mold temperature of 80° C. and a cylinder temperature of 280° C., and the Charpy impact resistance ($kJ/m^2$) was measured at a temperature of 23° C. A higher numerical value indicates better impact resistance.

In the tables this is expressed as "Charpy."

[Heat Resistance Evaluation: DTUL (Deflection Temperature Under Load) (Units: ° C.)]

After the pellets were dried for 5 hours at 80° C., they were injection molded with an injection molding machine model Cycap M-2 (mold clamping force 75 tons) from Sumitomo Heavy Industries, Ltd., using a molding cycle of 50 seconds at a mold temperature of 80° C. and a cylinder temperature of 280° C. to form 4 mm thick ISO test pieces in accordance with 15075-1 and 75-2, and then measurement was performed under a load of 1.80 MP (method A).

In the tables this is expressed as "DTUL."

[Flow Rate Per Unit Time: Q Value (Units: $\times 10^{-2}$ $cm^3/sec$)]

After pellets obtained by the above manufacturing process were dried for 4 hours or longer at 80° C., the flow rate per unit time of the composition, i.e., the Q value (units: $\times 10^{-2}$ $cm^3/sec$), was measured using an overhead flow tester at 280° C. with a load of 160 kgf to evaluate flow properties. An orifice of 1 mm in diameter by 10 mm long was used.

In the tables this is expressed as "Q value."

Examples 1 to 6, Comparative Examples 1 to 3, Reference Example 1

<Examples of case i) wherein the polycarbonate resin contains only the oligomeric phosphoric acid ester flame retardant (B1)>

These examples were blended in the ratios (mass ratios) shown in Table 3 below and evaluated. The results are shown in Table 3.

TABLE 3

|  |  | Ex. | | | | | | Comp. Ex. | | | Ref. Ex. |
|---|---|---|---|---|---|---|---|---|---|---|---|
|  | Symbol | 1 | 2 | 3 | 4 | 5 | 6 | 1 | 2 | 3 | 1 |
| Composition | A1 | 100 | 100 | 100 | 100 | 100 | 51.6 | 100 | 100 | 100 | 100 |
|  | A2 |  |  |  |  |  | 48.4 |  |  |  |  |
|  | B1 | 11.7 | 11.9 | 12 | 12 | 12.2 | 19.7 | 11.6 | 12 | 11.9 | 12.5 |
|  | C1 | 3.5 | 4.8 | 6 |  | 7.3 | 6.6 | 2.3 |  | 5.9 | 10 |
|  | C2 |  |  |  | 6 |  |  |  |  |  |  |
|  | C3 |  |  |  |  |  |  |  | 6 |  |  |
|  | D | 1.2 | 1.2 | 1.2 | 1.2 | 1.2 | 3.6 | 1.2 | 1.2 |  | 1.3 |
|  | E | 0.6 | 0.6 | 0.6 | 0.6 | 0.6 | 0.6 | 0.6 | 0.6 | 0.6 | 0.6 |
|  | F1 | 0.04 | 0.04 | 0.04 | 0.04 | 0.04 | 0.04 | 0.04 | 0.04 | 0.04 | 0.04 |
|  | F2 | 0.06 | 0.06 | 0.06 | 0.06 | 0.06 | 0.06 | 0.06 | 0.06 | 0.06 | 0.06 |
|  | G | 0.4 | 0.4 | 0.4 | 0.4 | 0.4 | 0.4 | 0.4 | 0.4 | 0.4 | 0.4 |

TABLE 3-continued

|  | Symbol | Ex. 1 | Ex. 2 | Ex. 3 | Ex. 4 | Ex. 5 | Ex. 6 | Comp. Ex. 1 | Comp. Ex. 2 | Comp. Ex. 3 | Ref. Ex. 1 |
|---|---|---|---|---|---|---|---|---|---|---|---|
| Q value |  | 25.8 | 26.2 | 25.8 | 23.2 | 26.2 | 44.6 | 24.9 | 26.9 | 25.2 | 25.6 |
| UL flame resistance (0.5 mm t) |  | V-0 | V-0 | V-1 | V-1 | V-1 | V-0 | V-2 | V-2 | V-2 | NR |
| Appearance |  | ○ | ○ | ○ | ○ | ○ | ○ | x | x | ○ | ○ |
| Charpy (kJ/m$^2$) |  | 14 | 16 | 26 | 16 | 55 | 15 | 9 | 30 | 24 | 62 |
| DTUL (° C.) |  | 96 | 96 | 96 | 95 | 96 | 85 | 96 | 96 | 96 | 96 |

From Examples 1 to 6 in Table 3 it is clear that a polycarbonate resin composition containing the respective predetermined amount of the oligomeric phosphoric acid ester flame retardant (B1) alone in the polycarbonate resin (A) and further containing the siloxane-based core/shell elastomer (C) and carbon black (D) stipulated in the present invention has a high level of flame resistance and impact resistance, and excellent surface appearance (low-gloss property).

Meanwhile, it is clear that the polycarbonate resin compositions of the Comparative Examples, which do not satisfy the requirements stipulated in the present invention, have poor flame resistance, and the impact resistance and appearance are also unsatisfactory. Furthermore, from Reference Example 1 it is clear that when the resin composition contains only the oligomeric phosphoric acid ester flame retardant (B1), the flame resistance and impact resistance easily decline if the amount of siloxane-based core/shell elastomer exceeds 9 parts by mass.

Examples 7 to 11, Comparative Examples 4 and 5, Reference Example 2

<Examples of case ii) wherein the polycarbonate resin contains only the phosphazene flame retardant (B2)>

These examples were blended in the ratios (mass ratios) shown in Table 4 below and evaluated. The results are shown in Table 4.

From Examples 7 to 11 in Table 4 it is clear that a polycarbonate resin composition containing the respective predetermined amount of the phosphazene flame retardant (B2) alone in the polycarbonate resin (A) and further containing the siloxane-based core/shell elastomer (C) and carbon black (D) stipulated in the present invention has a high level of flame resistance and impact resistance, and excellent surface appearance (low-gloss property).

Meanwhile, it is clear that the polycarbonate resin compositions of the Comparative Examples, which do not satisfy the requirements stipulated in the present invention, have poor flame resistance, and the impact resistance and appearance are also unsatisfactory. Moreover, from Reference Example 2 it is clear that when the resin composition contains only the phosphazene flame retardant (B2), the flame resistance easily deteriorates if the amount thereof is less than 10 parts by mass.

Examples 12 to 16, Comparative Examples 6 to 8

<Examples of case iii) wherein the polycarbonate resin contains both the oligomeric phosphoric acid ester flame retardant (B1) and the phosphazene flame retardant (B2)>

These examples were blended in the ratios (mass ratios) shown in Table 5 below and evaluated. The results are shown in Table 5.

TABLE 4

|  | Symbol | Ex. 7 | Ex. 8 | Ex. 9 | Ex. 10 | Ex. 11 | Comp. Ex. 4 | Comp. Ex. 5 | Ref. Ex. 2 |
|---|---|---|---|---|---|---|---|---|---|
| Composition | A1 | 100 | 96.4 | 78.6 | 56.8 | 56.8 | 56.8 | 86.9 | 100 |
|  | A2 |  | 3.6 | 21.4 | 43.2 | 43.2 | 43.2 | 13.1 |  |
|  | B1 |  |  |  |  |  |  |  |  |
|  | B2 | 12.3 | 13.7 | 16.6 | 19.7 | 20.5 |  | 15.2 | 9.6 |
|  | C1 | 6 | 6.1 | 6.2 | 6.4 |  | 6.3 |  | 6.2 |
|  | C2 |  |  |  |  | 10.9 |  |  |  |
|  | C3 |  |  |  |  |  |  | 6.2 |  |
|  | D | 1.2 | 1.2 | 1.2 | 1.3 | 1.4 |  | 1.2 | 1.2 |
|  | E | 0.6 | 0.6 | 0.6 | 0.6 | 0.7 | 0.6 | 0.6 | 0.6 |
|  | F1 | 0.04 | 0.04 | 0.04 | 0.04 | 0.04 | 0.04 | 0.04 | 0.04 |
|  | F2 | 0.06 | 0.06 | 0.06 | 0.06 | 0.06 | 0.06 | 0.06 | 0.06 |
|  | G | 0.4 | 0.4 | 0.4 | 0.4 | 0.4 | 0.4 | 0.4 | 0.4 |
| Q value |  | 22.8 | 23.9 | 25.4 | 24.3 | 20.2 | 24.1 | 24.7 | 17.8 |
| UL flame resistance (0.5 mm t) |  | V-0 | V-0 | V-0 | V-0 | V-0 | V-2 | NR | V-2 |
| Appearance |  | ○ | ○ | ○ | ○ | ○ | x | ○ |  |
| Charpy (kJ/m$^2$) | | 64 | 68 | 75 | 78 | 64 | 69 | 72 | 64 |
| DTUL (° C.) |  | 102 | 100 | 97 | 93 | 91 | 93 | 98 | 103 |

TABLE 5

|  | Symbol | Ex. 12 | 13 | 14 | 15 | 16 | Comp. Ex. 6 | 7 | 8 |
|---|---|---|---|---|---|---|---|---|---|
| Composition | A | 100 | 100 | 100 | 100 | 100 | 100 | 100 | 100 |
|  | B1 | 6.2 | 3.1 | 1.3 | 1.3 | 1.3 | 9.3 | 14.7 | 6.1 |
|  | B2 | 9.3 | 12.4 | 15 | 15.6 | 15.6 | 6.2 |  | 7.3 |
|  | B1/B2 | 40/60 | 20/80 | 8/92 | 8/92 | 8/92 | 60/40 | 100/0 | 46/54 |
|  | B1 + B2 | 15.5 | 15.5 | 16.3 | 16.9 | 16.9 | 15.5 | 14.7 | 13.4 |
|  | C1 | 6.2 | 6.2 | 6.2 | 9.5 |  | 6.2 |  |  |
|  | C2 |  |  |  |  | 9.5 |  |  |  |
|  | C3 |  |  |  |  |  |  | 6.2 | 6.1 |
|  | D | 1.2 | 1.2 | 1.3 | 1.3 | 1.3 | 1.2 | 1.2 | 1.2 |
|  | E | 0.6 | 0.6 | 0.6 | 0.6 | 0.6 | 0.6 | 0.6 | 0.6 |
|  | F1 | 0.04 | 0.04 | 0.04 | 0.04 | 0.04 | 0.04 | 0.04 | 0.04 |
|  | F2 | 0.06 | 0.06 | 0.06 | 0.06 | 0.06 | 0.06 | 0.06 | 0.06 |
|  | G | 0.4 | 0.4 | 0.4 | 0.4 | 0.4 | 0.4 | 0.4 | 0.4 |
| Q value |  | 28.5 | 27.2 | 27.4 | 27.9 | 26.1 | 29.1 | 30.9 | 25.5 |
| UL flame resistance (0.5 mm t) |  | V-0 | V-0 | V-0 | V-0 | V-0 | V-1 | NR | NR |
| Appearance |  | ○ | ○ | ○ | ○ | ○ | ○ | x | x |
| Charpy (kJ/m$^2$) |  | 47 | 52 | 67 | 58 | 48 | 26 | 58 | 74 |
| DTUL (° C.) |  | 94 | 96 | 95 | 93 | 92 | 93 | 91 | 98 |

From Examples 12 to 16 in Table 5 it is clear that a polycarbonate resin composition containing both the respective predetermined amount of the oligomeric phosphoric acid ester flame retardant (B1), the phosphazene flame retardant (B2) in the polycarbonate resin (A), and further containing the siloxane-based core/shell elastomer (C) and carbon black (D) stipulated in the present invention has a high level of flame resistance and impact resistance, and excellent surface appearance (low-gloss property).

Meanwhile, it is clear that the polycarbonate resin compositions of the Comparative Examples, which do not satisfy the requirements stipulated in the present invention, have poor flame resistance, and the impact resistance and appearance are also unsatisfactory.

Therefore, the Examples and Comparative Examples of Tables 3 to 5 above confirm that the configuration of the present invention is the first to achieve the advantageous effect of having high level of flame resistance and impact resistance, and excellent surface appearance (low-gloss property) in thin-wall molding.

INDUSTRIAL APPLICABILITY

The polycarbonate resin composition of the present invention is a polycarbonate resin material for thin-wall molding that has a high level of flame resistance and impact resistance, and excellent surface appearance (low-gloss property), and it can be widely used in parts, particularly parts for electric and electronic devices, office automation equipment, data terminal devices, and household appliances, so the industrial applicability thereof is extremely high.

The invention claimed is:

1. A polycarbonate resin composition comprising polycarbonate resin (A) and a total of 5 to 30 parts by mass of an oligomeric phosphoric acid ester flame retardant (B1) and a phosphazene flame retardant (B2), 3 to 9.7 parts by mass of a siloxane-based core/shell elastomer (C) and 0.8 to 5 parts by mass of carbon black (D) with respect to 100 parts by mass of polycarbonate resin (A),
wherein
a content ratio of the oligomeric phosphoric acid ester flame retardant (B1) to the phosphazene flame retardant (B2) is 1 to 49 mass % of (B1):99 to 51 mass % of (B2),
the siloxane-based core/shell elastomer (C) has a silicon content of 9.1 to 30 mass % and a number-average particle size in the range of 50 to 1,000 nm, and
a flow rate per unit time of the resin composition is 15 to 50×10$^{-2}$ cm$^3$/sec when measured with an overhead flow tester at 280° C. with a load of 160 kgf/cm$^2$ in accordance with the method of JIS K7210 Appendix C.

2. The polycarbonate resin composition according to claim 1, in the form of a molded article having a thin-walled section with a thickness of 0.6 mm or less, that is a frame or housing for a battery pack.

3. The polycarbonate resin composition of claim 1, wherein the oligomeric phosphoric acid ester flame retardant (B1) is a phosphoric acid ester of formula 1:

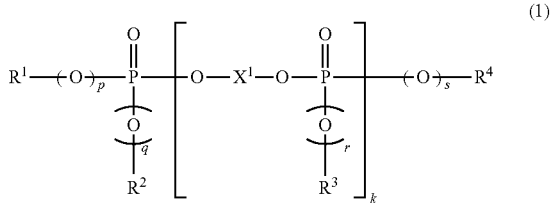

(1)

wherein R$^1$, R$^2$, R$^3$, and R$^4$ are each independently a C$_{1-6}$ alkyl group or optionally alkyl-substituted C$_{6-20}$ aryl group; p, q, r, and s are each independently either 0 or 1; k is an integer from 1 to 5; and X$^1$ is an aryl group.

4. The polycarbonate resin composition according to claim 3, wherein the siloxane-based core/shell elastomer (C) is an elastomer having a core comprising a siloxane-based rubber component and a shell comprising either an acrylic or acrylonitrile-styrene (co)polymer component.

5. The polycarbonate resin composition according to claim 4, wherein said polycarbonate resin further comprises 0.001 to 1 parts by mass of a fluorine-containing resin (E) with respect to 100 parts by mass of polycarbonate resin (A).

6. The polycarbonate resin composition according to claim 1, wherein the siloxane-based core/shell elastomer (C) is an elastomer having a core comprising a siloxane-based rubber component and a shell comprising either an acrylic or acrylonitrile-styrene (co)polymer component.

7. The polycarbonate resin composition according to claim 1, further comprising 0.001 to 1 parts by mass of a fluorine-containing resin (E) with respect to 100 parts by mass of polycarbonate resin (A).

8. The polycarbonate resin composition according to claim 1, in the form of a molded article having a thin-walled section with a thickness of 0.6 mm or less.

9. The polycarbonate resin composition according to claim 1, in the form of a molded article having a thin-walled section with a thickness of 0.3-0.4 mm.

10. The polycarbonate resin composition according to claim 1, wherein polycarbonate resin (A) has a viscosity average molecular weight of 10,000-40,000.

11. The polycarbonate resin composition according to claim 10, wherein a concentration of terminal hydroxyl groups in the polycarbonate resin is 10-1,000 ppm based on the mass of the terminal hydroxyl groups with respect to the mass of the polycarbonate resin.

12. The polycarbonate resin composition according to claim 10, wherein polycarbonate resin (A) further comprises a polycarbonate oligomer having a viscosity average molecular weight of 1,500-9,500 in a positive amount of up to 30 mass % of the polycarbonate resin including the polycarbonate oligomer.

13. The polycarbonate resin composition of claim 12, wherein the oligomeric phosphoric acid ester flame retardant (B1) is a phosphoric acid ester of formula 1:

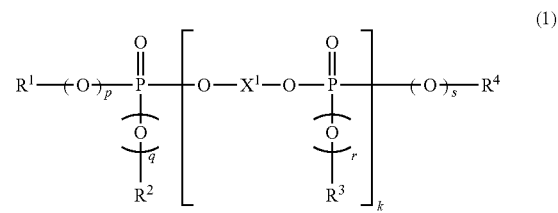

wherein $R^1$, $R^2$, $R^3$, and $R^4$ are each independently a $C_{1\text{-}6}$ alkyl group or optionally alkyl-substituted $C_{6\text{-}20}$ aryl group; p, q, r, and s are each independently either 0 or 1; k is an integer from 1 to 5; and $X^1$ is an aryl group.

14. The polycarbonate resin composition according to claim 13, wherein the siloxane-based core/shell elastomer (C) is an elastomer having a core comprising a siloxane-based rubber component and a shell comprising either an acrylic or acrylonitrile-styrene (co)polymer component.

15. The polycarbonate resin composition according to claim 14, further comprising 0.001 to 1 parts by mass of a fluorine-containing resin (E) with respect to 100 parts by mass of polycarbonate resin (A).

* * * * *